United States Patent
Wang et al.

(10) Patent No.: US 8,958,753 B2
(45) Date of Patent: Feb. 17, 2015

(54) SIGNALING OF OTHER-CELL SIGNAL'S CONFIGURATION INFORMATION TO FACILITATE INTERFERENCE CANCELLATION AT A MOBILE TERMINAL

(75) Inventors: Yi-Pin Eric Wang, Fremont, CA (US); Andres Reial, Malmö (SE); Edgar Ramos, Espoo (FI); Stefan Parkvall, Stockholm (SE); Stephen Grant, Pleasanton, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 246 days.

(21) Appl. No.: 13/451,076

(22) Filed: Apr. 19, 2012

(65) Prior Publication Data

US 2013/0077578 A1 Mar. 28, 2013

Related U.S. Application Data

(60) Provisional application No. 61/606,785, filed on Mar. 5, 2012.

(51) Int. Cl.
*H04B 1/00* (2006.01)
*H04W 72/00* (2009.01)
(Continued)

(52) U.S. Cl.
CPC ........ *H04W 72/1278* (2013.01); *H04W 72/082* (2013.01)
USPC .......... 455/63.1; 370/328; 370/329; 370/252; 370/332; 455/450; 455/452.2; 375/346

(58) Field of Classification Search
CPC ..... H04W 24/00; H04W 84/18; H04W 84/12; H04W 80/04; H04W 88/06; H04W 72/04; H04W 88/08; H04W 76/00; H04W 72/0446; H04W 72/0453; H04W 36/18; H04W 36/0011; H04W 36/30; H04W 43/50; H04W 43/0852; H04L 2012/5636
USPC ......... 370/392, 310, 329, 330, 328, 331, 332, 370/431, 252; 455/63.1, 63.2, 63.3, 450, 455/452.2; 375/346
See application file for complete search history.

(56) References Cited

U.S. PATENT DOCUMENTS

| 2007/0286124 | A1 | 12/2007 | Grant et al. |
| 2008/0043867 | A1* | 2/2008 | Blanz et al. ............ 375/260 |

(Continued)

FOREIGN PATENT DOCUMENTS

| EP | 1 971 061 A1 | 9/2008 |
| EP | 2 280 492 A1 | 2/2011 |

(Continued)

OTHER PUBLICATIONS

R1-111650, 3GPP TSG RAN1 #65, "DL signaling to enhance Mu MIMO operation", Barcelona, Spain, May 9-13, 2011 (2 pages).

(Continued)

*Primary Examiner* — Benjamin H Elliott, IV
*Assistant Examiner* — Eric Nowlin
(74) *Attorney, Agent, or Firm* — Baker Botts, LLP

(57) ABSTRACT

In MU-MIMO scenarios, a target mobile terminal can be exposed to data streams intended for other mobile terminals. If the target mobile terminal is capable of interference cancellation, then a serving base station can provide the target mobile terminal with interference information so that the target mobile terminal can efficiently cancel interferences due to these interfering data streams. The interference information includes one or more configuration information, each of which characterizes a related interfering data stream. The serving base station provides the interference information over one or more radio resources that are exclusive allocated to the target mobile terminal or are allocated for common listening. The serving base station exchanges configuration information with neighboring base stations over inter-BS links. The inter-BS links use resources that are different from the radio resources used between the base stations and the mobile terminals.

15 Claims, 19 Drawing Sheets

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04W 4/00* | (2009.01) |
| *H03D 3/24* | (2006.01) |
| *H04W 72/12* | (2009.01) |
| *H04W 72/08* | (2009.01) |

(56) References Cited

U.S. PATENT DOCUMENTS

| | | | | |
|---|---|---|---|---|
| 2010/0190447 | A1* | 7/2010 | Agrawal et al. | 455/63.1 |
| 2010/0309861 | A1* | 12/2010 | Gorokhov et al. | 370/329 |
| 2011/0080975 | A1* | 4/2011 | Toda et al. | 375/295 |
| 2011/0154154 | A1* | 6/2011 | Seo et al. | 714/755 |
| 2012/0155411 | A1* | 6/2012 | Ancora et al. | 370/329 |

FOREIGN PATENT DOCUMENTS

| | | |
|---|---|---|
| EP | 2 413 514 A1 | 2/2012 |
| WO | 2006/062356 A1 | 6/2006 |
| WO | 2010/141911 A2 | 12/2010 |

OTHER PUBLICATIONS

International Search Report and Written Opinion mailed Oct. 4, 2013 in International Application No. PCT/SE2013/050178 (13 pages total).

PCT Notification Concerning Transmittal of International Preliminary Report on Patentability (Chapter 1 of the Patent Cooperation Treaty) for International Application No. PCT/SE2013/050019, Sep. 9, 2014.

International Search Report & Written Opinion w/cover sheet dated Dec. 20, 2013 in corresponding International Application No. PCT/SE2013/050019 (18 pages total).

Inventors: Yi-Pin Eric Wang et al.; U.S. Appl. No. 13/824,763, filed Mar. 18, 2013, "Signaling Data Channel's Configuration Information to Facilitate Interference Cancellation".

* cited by examiner

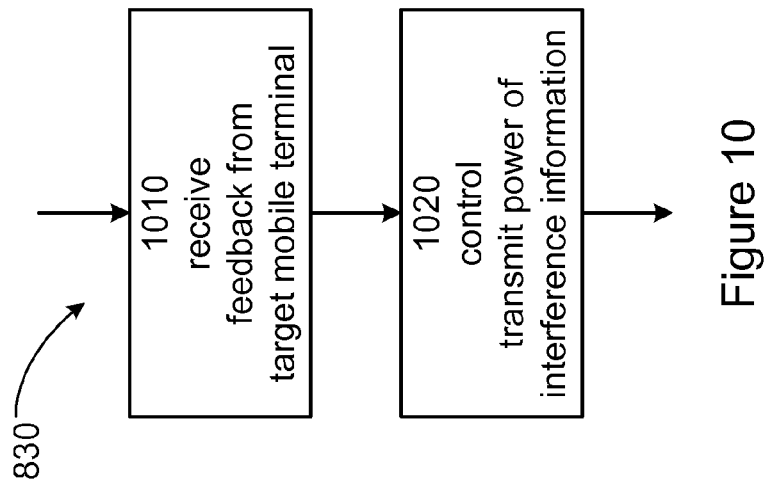
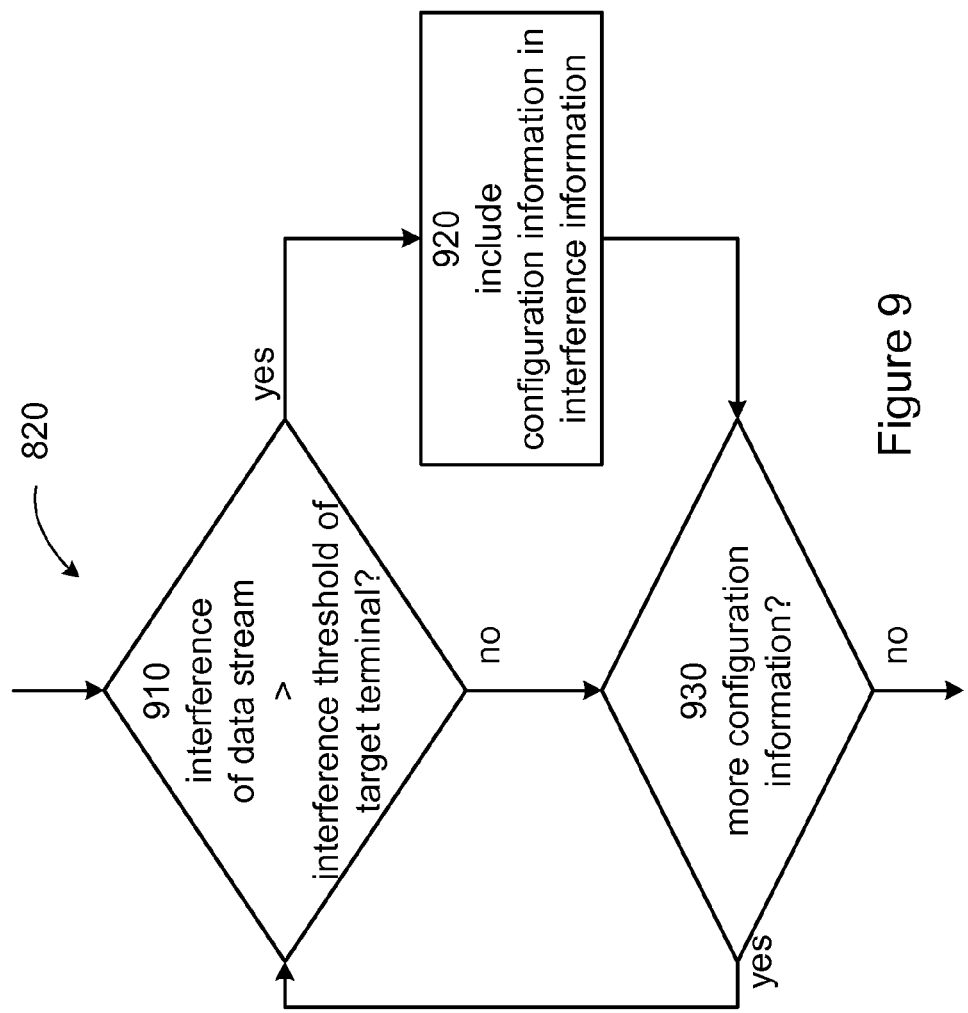
Figure 10
Figure 9

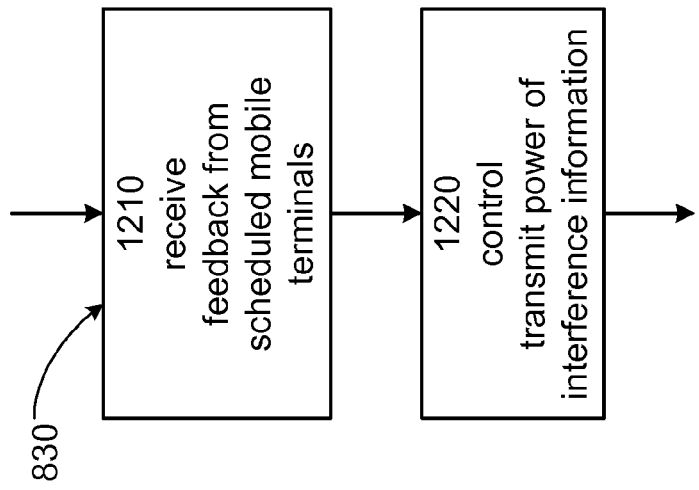
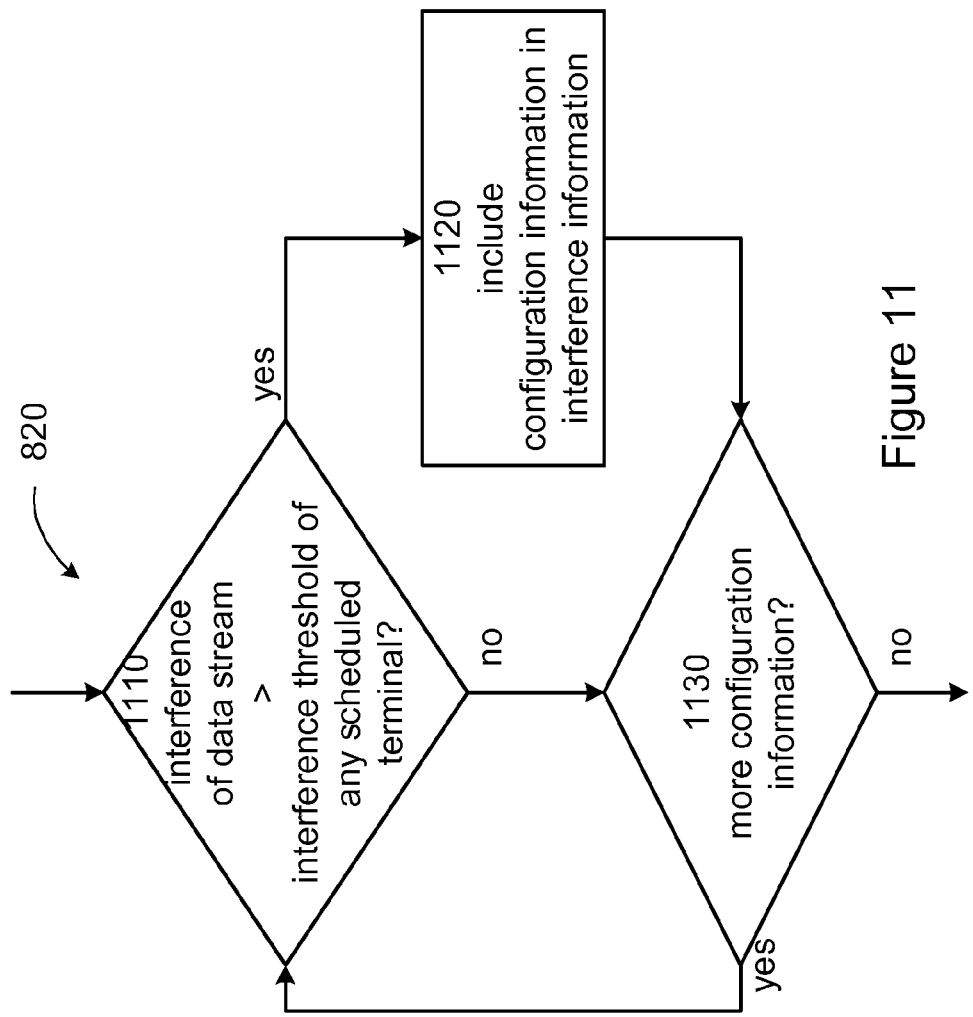

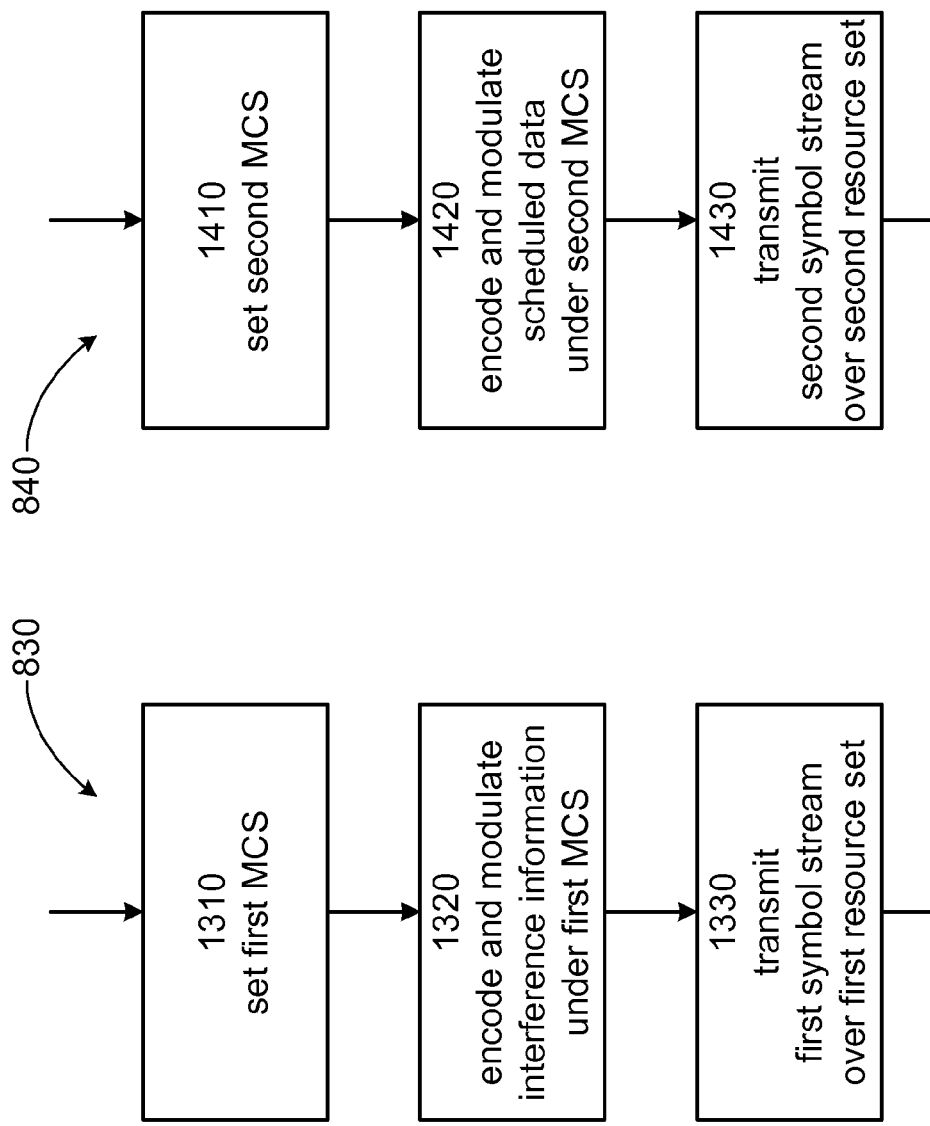

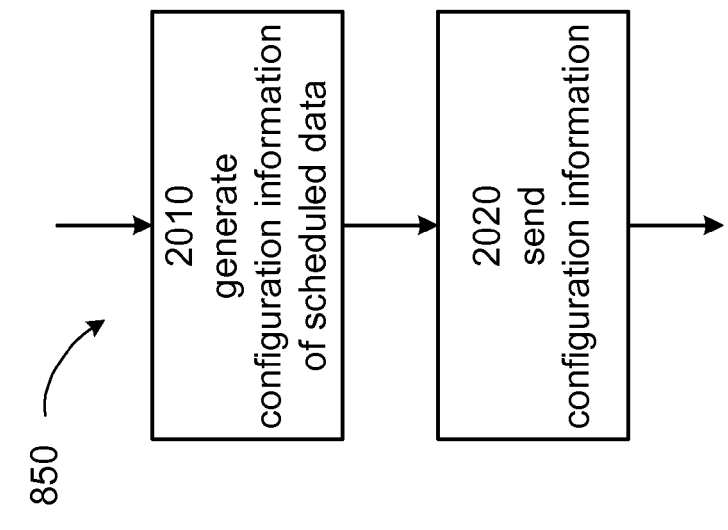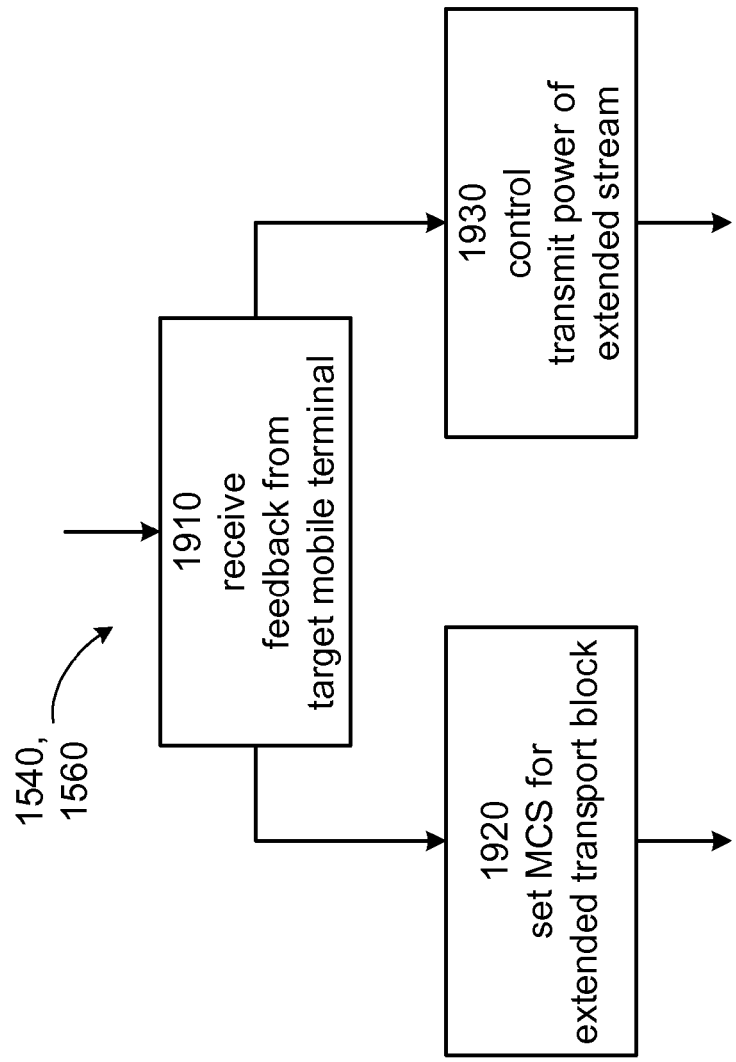

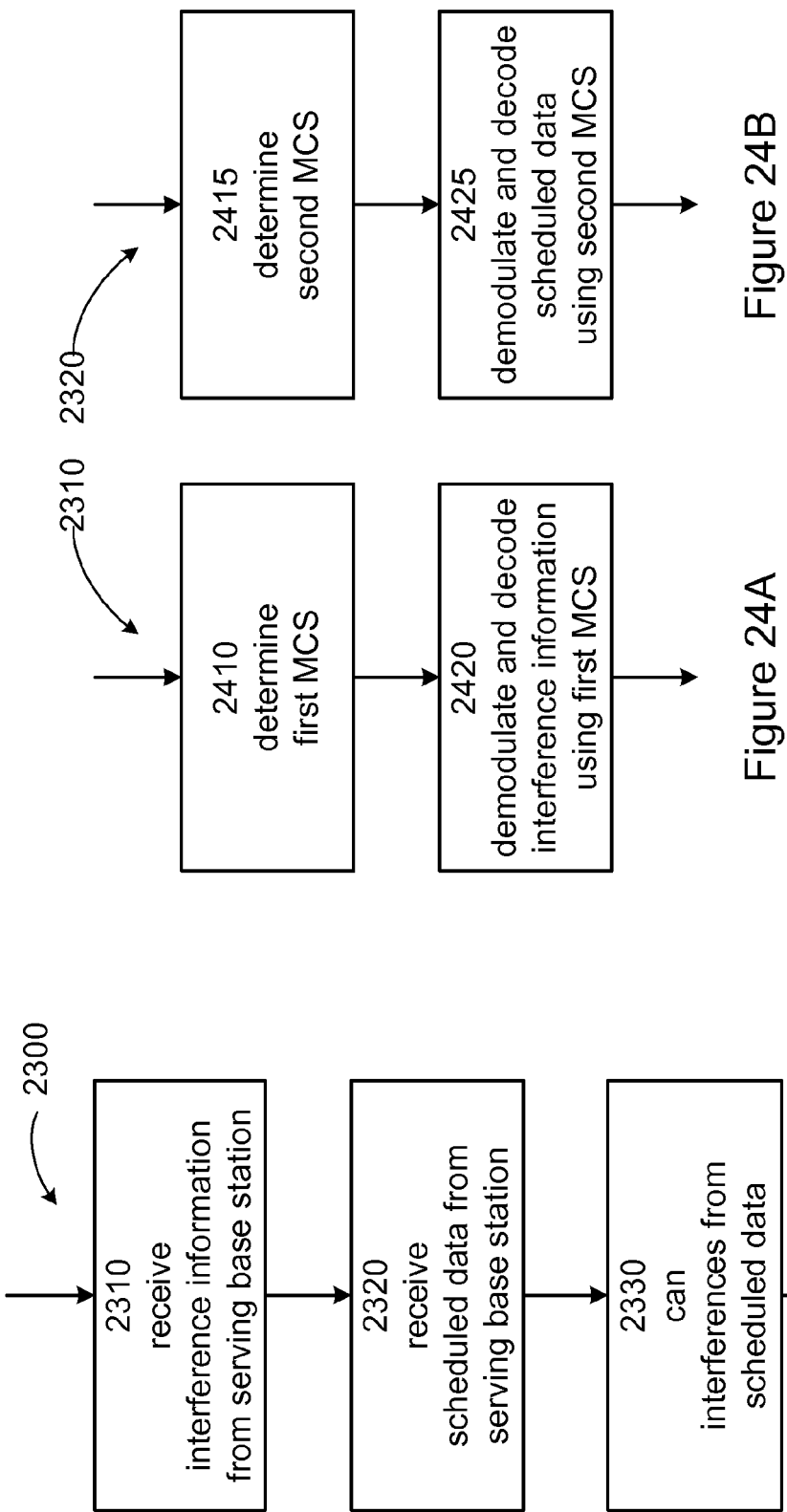

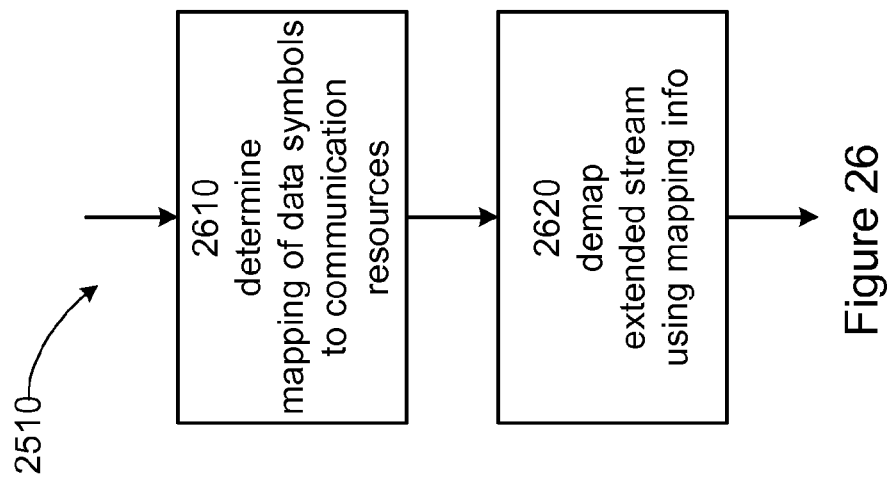
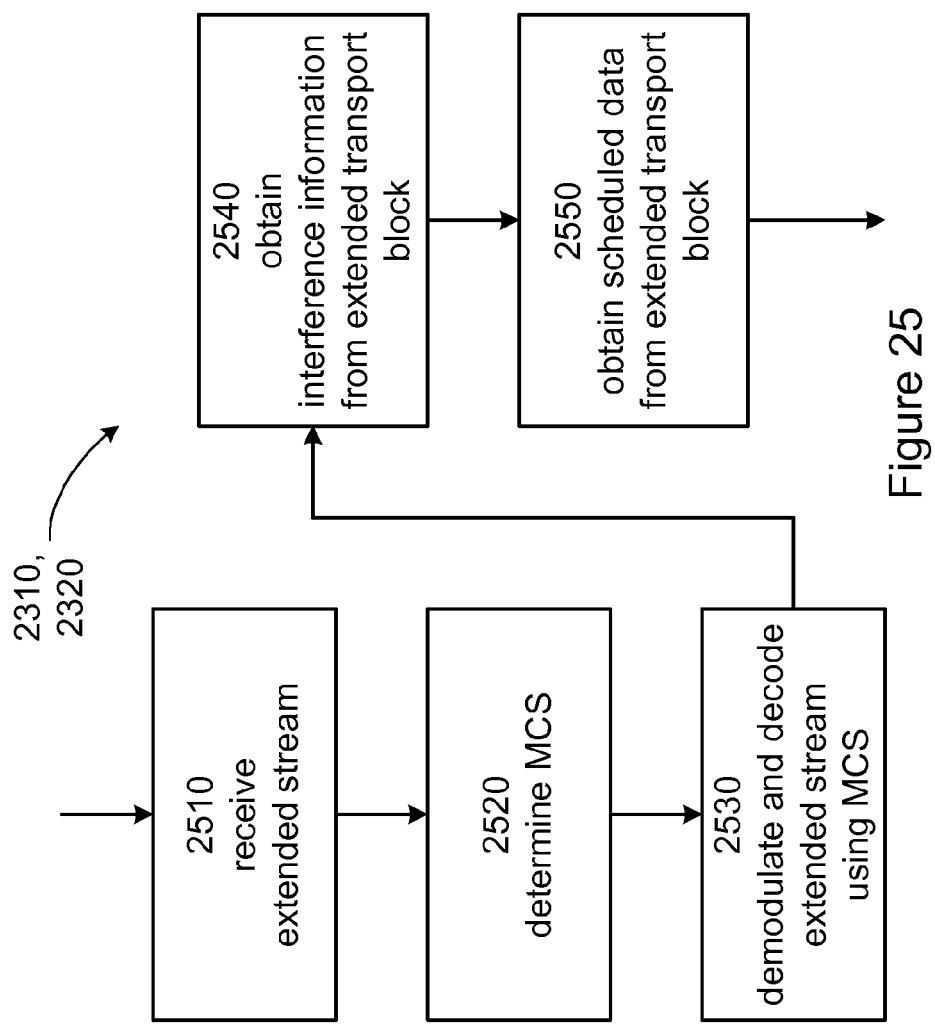

SIGNALING OF OTHER-CELL SIGNAL'S CONFIGURATION INFORMATION TO FACILITATE INTERFERENCE CANCELLATION AT A MOBILE TERMINAL

RELATED APPLICATIONS

This application claims priority and benefit of U.S provisional application 61/606,785 entitled "SIGNALING DATA CHANNEL'S CONFIGURATION INFORMATION TO FACILITATE INTERFERENCE CANCELLATION" filed on Mar. 5, 2012, which is incorporated herein by reference in its entirety.

TECHNICAL FIELD

The technical field of the present disclosure generally relates to interference cancellation in wireless communication systems. In particular, techniques to transmit configuration information to interference cancellation (IC) capable terminals are presented.

BACKGROUND

Mobile data traffic is projected to grow at a phenomenal rate in the years to come. To cope with such growth, cellular network operators and equipment vendors are exploring various technologies to significantly improve network capacity. Utilization of more radio spectrum, heterogeneous network (HetNet) deployment, cell site densification, and coordinated multiple-point (CoMP) transmission and reception are among the ones that are currently being explored.

Interference mitigation receiver is also a focus area. It can improve the network capacity of existing deployments. It can also maximize the benefit of HetNet and CoMP. A post-decoding successive interference cancellation (IC) receiver can achieve open-loop MIMO capacity under the condition of perfect per-layer rate control. A MIMO stream is detected and decoded first and then cancelled from the received composite signal before the next stream is detected.

The traditionally hard-decision based interference cancellation scheme has been extended to soft-decision based interference cancellation schemes. This allows cancellation to still be performed even when the previously decoded stream is not error free, e.g., when the per-layer rate control is not perfect. Soft symbol estimates can be formed based on the decoder output bit likelihood ratios. When the bit likelihood ratios are of high magnitudes, indicating strong confidence in the bit estimates, the soft symbol estimates are likely to be identical to, or in the vicinity of, the actual transmitted symbols. In such cases, interference contributed by these symbols can be very much cancelled. On the other hand, if the bit likelihood ratios are of low magnitudes, indicating weak confidence in the bit estimates, the soft symbol estimates will be in the vicinity of the origin, resulting in almost no cancellation.

Regardless of whether hard or soft decision based symbols are used in interference cancellation, forming interfering symbol estimates using the decoder outputs is an important aspect. This allows the quality of interference symbol estimates to be boosted by the coding gain. If the interfering symbols come from a MIMO stream intended for the same user equipment (UE) as seen in FIG. 1A, the UE is informed of the interfering data stream's modulation and coding rate, so-called transport format (TF) or modulation and coding scheme (MCS). In this case, post-decoding interference cancellation can readily be performed.

However, in multi-user MIMO (MU-MIMO) scenarios, as illustrated in FIG. 1B, the interfering data stream is intended for another UE. Thus, a co-scheduled UE does not have the knowledge of the TF or MCS used in the interfering data stream. It is therefore more difficult to cancel the interfering data stream. In LTE, the encoded bits of a physical data channel are scrambled by an identity number associated with the intended UE. Thus, a descrambling step is needed before decoding. It is therefore more difficult to cancel the interfering data stream in the MU-MIMO case.

Severe inter-cell interference can be experienced by a UE at a cell edge. Such interference can originate from different base stations as illustrated in FIG. 1C. Like the case of MU-MIMO, the TF, MCS or UE ID of the interfering data stream is not known to the victim UE at the cell edge.

The problem of inter-cell interference can be more pronounced in a range-expansion zone of a HetNet deployment as illustrated in FIG. 1D. In this figure, the striped area represents the range-expansion zone where the path loss to the macro base station is higher than that to the closest pico base station while the received power from the macro base station is higher than that from the closest pico base station due to large transmit power difference.

When a UE is in the range-expansion zone, it can be beneficial to offload the traffic to the pico base station as this allows the macro and other spatially isolated pico base stations to serve other UEs using the same radio resources (time and frequency allocation). However, the UE in the range-expansion zone can be subject to severe interference from the macro base station if one or more data streams are transmitted by the macro base station.

For MU-MIMO and other-cell interference, it is beneficial to cancel the interfering data stream based on post-decoding symbol estimates. Such cancellation can provide dramatic throughput increases for an affected UE in many typical scenarios.

Without the knowledge of the TF, MCS or UE ID used in the interfering data stream, a victim UE has to detect this information blindly or through eavesdropping. However, the complexity of blindly detecting the coding rate is very high. Eavesdropping on the signalling channel carrying TF or MCS is also very difficult as such signalling channel is masked by the intended UE's identity, which is not known to the victim UE. The UE IDs may be inferred by using blind (hypothesis-testing) approaches, but the related complexity is again high and the detection robustness in environments with fast user turn-around may be low. Similarly, blindly inferring the UE ID from an LTE data channel is extremely difficult.

In addition to TF, MCS or UE ID, radio resource allocation parameters also need to be known. In high-speed packet access (HSPA), this includes the information about scrambling code channelization codes allocated to the interfering data stream, whereas in LTE, this includes the information about the radio resource elements (REs) allocated to the interfering data stream. Blindly detecting such radio resource allocation parameters is also extremely difficult.

In addition to blind detection complexity issues, obtaining the configuration information via eavesdropping is complicated by the fact that the downlink (DL) control channel for the other UE(s) may be received with insufficient signal-to-interference-and-noise ratio (SINR) by the victim UE, due to worse effective geometry and/or transmit power control (TPC) being applied to the control channel.

Base station can signal its current antenna configuration information to inactive UEs for facilitating channel quality indicator (CQI) estimation has been proposed in Grant et al., US Publication 2007/0286124 A1 herein incorporated by reference in its entirety. According to Grant et al., such signaling is broadcast. Furthermore, a special group identifier may be used to reach a group of mobile UEs. However, broadcasting antenna configuration information alone does not help much in facilitating interference cancellation at mobile UEs.

SUMMARY

A non-limiting aspect of the disclosed subject matter is directed to a method performed in a serving base station of a wireless network to provide services to a target mobile terminal that is capable of interference cancellation. The method comprises a step of receiving from one or more neighboring base stations over one or more inter-BS links one or more configuration information related to one or more interfering data streams. Each interfering data stream is a data stream transmitted by a neighboring base station and intended for a mobile terminal other than the target mobile terminal. Each of the configuration information characterizes a related interfering data stream. For example, the configuration information can include information that enables the related interfering data stream to be decoded. The method also comprises a step of forming interference information for the target mobile terminal based on the configuration information received from the neighboring base station(s). The interference information comprises the configuration information related to at least one interfering data stream. The method further comprises a step of transmitting the interference information to the target mobile terminal over a radio resource set. The radio resource set comprises one or more radio resources used to carry data from the serving base station to the target mobile terminal. The method yet further comprises a step of transmitting scheduled data to the target mobile terminal over the radio resource set. The scheduled data comprises one or more data streams intended for transmission from the serving base station to the target mobile terminal. The inter-BS links are communication links for communication among the base stations. Each inter-BS-link utilizes communication resource(s) different from the radio resource(s) used between the base stations and mobile terminals in the network. The radio resource(s) used to transmit the scheduled data can be exclusively allocated to the target mobile terminal. The radio resource(s) used to transmit the interference information can be either exclusively allocated to the target mobile terminal or can be allocated for common listening.

Another non-limiting aspect of the disclosed subject matter is directed to a non-transitory computer storage medium which has stored therein programming instructions. When a computer of a base station executes the programming instructions, the computer executes a method to provide services to a target mobile terminal that is capable of interference cancellation as described above.

Another non-limiting aspect of the disclosed subject matter is directed to a base station of a wireless network. The base station is structured to provide communication services to a target mobile terminal. The base station comprises a network communicator, an interference information generator, and a transmission controller. The network communicator is structured to receive from one or more neighboring base stations over one or more inter-BS links one or more configuration information related to one or more interfering data streams. Each interfering data stream is a data stream transmitted by a neighboring base station and intended for a mobile terminal other than the target mobile terminal. Each of the configuration information characterizes a related interfering data stream. The interference information generator is structured to form interference information for the target mobile terminal based on the configuration information received from the neighboring base station(s). The interference information comprises the configuration information related to at least one interfering data stream. The transceiver is structured to transmit the interference information and scheduled data to the target mobile terminal over a radio resource set. The radio resource set comprises one or more radio resources used to carry data from the serving base station to the target mobile terminal. The scheduled data comprises one or more data streams intended for transmission from the serving base station to the target mobile terminal. The inter-BS links are communication links for communication among the base stations. Each inter-BS-link utilizes communication resource(s) different from the radio resource(s) used between the base stations and mobile terminals in the network. The radio resource(s) used to transmit the scheduled data can be exclusively allocated to the target mobile terminal. The radio resource(s) used to transmit the interference information can be either exclusively allocated to the target mobile terminal or can be allocated for common listening.

Another non-limiting aspect of the disclosed subject matter is directed to a method performed in a target mobile terminal capable of performing interference cancellation. The method comprises a step of receiving interference information transmitted from a serving base station over a radio resource set. The interference information comprising one or more configuration information related to one or more interfering data streams. Each interfering data stream is a data stream transmitted by a neighboring base station and intended for a mobile terminal other than the target mobile terminal, and each of the configuration information characterizes a related interfering data stream. The method also comprises a step of receiving scheduled data transmitted from the serving base station over the radio resource set. The scheduled data comprises one or more data streams intended for transmission from the serving base station to the target mobile terminal. The method further comprises a step of canceling interferences from the scheduled data based on the interference information. The radio resource set comprises one or more radio resources allocated to carry data from the serving base station to the target mobile terminal. The radio resource(s) used to receive the scheduled data can be exclusively allocated to the target mobile terminal. The radio resource(s) used to receive the interference information can be either exclusively allocated to the target mobile terminal or can be allocated for common listening.

Yet another non-limiting aspect of the disclosed subject matter is directed to a non-transitory computer storage medium which has stored therein programming instructions. When a computer of an interference capable target mobile terminal executes the programming instructions, the computer executes a method to cancel interferences as described above.

Another non-limiting aspect of the disclosed subject matter is directed to a target mobile terminal structured to cancel interferences. The target mobile terminal comprises an interference canceller and an information receiver. The information receiver is structured to receive interference information transmitted from a serving base station over a radio resource set via a transceiver. The interference information comprises one or more configuration information related to one or more interfering data streams, each interfering data stream is a data stream transmitted by a neighboring base station and intended for a mobile terminal other than the target mobile terminal, and each of the configuration information characterizes a related interfering data stream. The information receiver is also structured to receive scheduled data, via the transceiver, transmitted from the serving base station over the radio resource set. The scheduled data comprises one or more data streams intended for transmission from the serving base station to the target mobile terminal. The interference canceller is structured to cancel interferences from the scheduled data based on the interference information. The radio resource set comprises one or more radio resources used to carry data from the serving base station to the target mobile terminal. The radio resource(s) used to receive the scheduled data can be exclusively allocated to the target mobile terminal. The radio resource(s) used to receive the interference information can be either exclusively allocated to the target mobile terminal or can be allocated for common listening.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

FIGS. 9, 11 illustrate flow charts of example processes performed in a base station to form interference information for a target mobile terminal;

FIGS. 10, 12 illustrate flow charts of example processes performed in a base station to transmit interference information to a target mobile terminal;

FIGS. 13, 14 illustrate flow charts of example processes performed in a base station to transmit interference information and to transmit scheduled data to a target mobile terminal;

FIGS. 16, 19 illustrate flow charts of example processes performed in a base station to transmit an extended stream to the target mobile terminal;

FIG. 20 illustrates a flow chart of an example process performed in a base station to send configuration information of scheduled data to other base stations;

FIG. 23 illustrates a flow chart of an example method performed in a mobile terminal capable of performing interference cancellation;

FIGS. 24A, 24B illustrate flow charts of example processes performed in a target mobile terminal to receive interference information and scheduled data from a serving base station;

FIG. 25 illustrates a flow chart of an example processes performed in a target mobile terminal to receive interference information and scheduled data from a serving base station; and FIG. 26 illustrates a flow chart of example processes performed in a target mobile terminal to receive an extended stream from a serving base station.

DETAILED DESCRIPTION

Figure 1A:
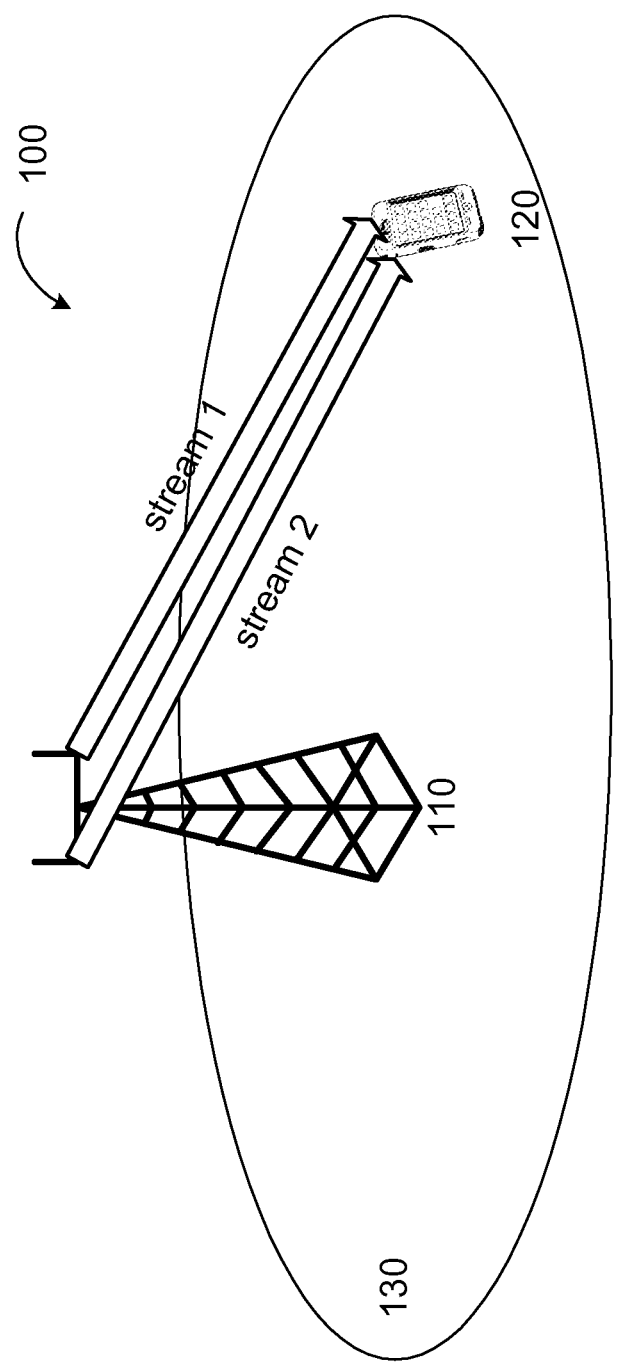
FIGS. 1A, 1B, 1C, 1D illustrate examples scenarios of interferences that can occur due to MIMO stream transmissions.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, HSPA—are used as examples for explanation purposes. Note that the technology described herein can be applied to non-3GPP standards, e.g., IS-95, cdma2000, 1xEVDO, etc. Thus, the scope of this disclosure is not limited to the set of 3GPP wireless network systems and can encompass many domains of wireless network systems. Also, a base station (e.g., RBS, NodeB, NB, eNodeB, eNB, etc.) will be used as an example of a network node in which the described method can be performed. However, it should be noted that the disclosed subject matter is applicable to any node, such as relay stations, that receive wireless signals. Also without loss of generality, mobile terminals (e.g., UE, mobile computer, PDA, etc.) will be used as examples of wireless terminals that communicate with the base station.

Figure 1B:
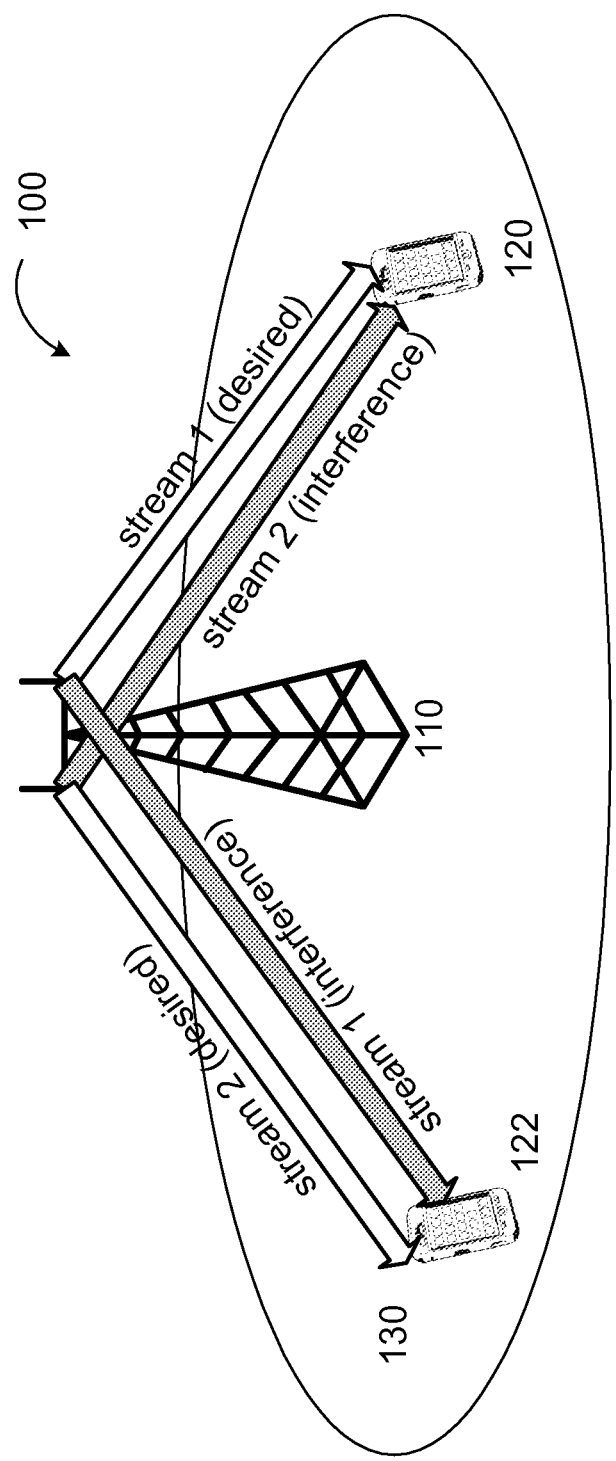
Figure 1C:
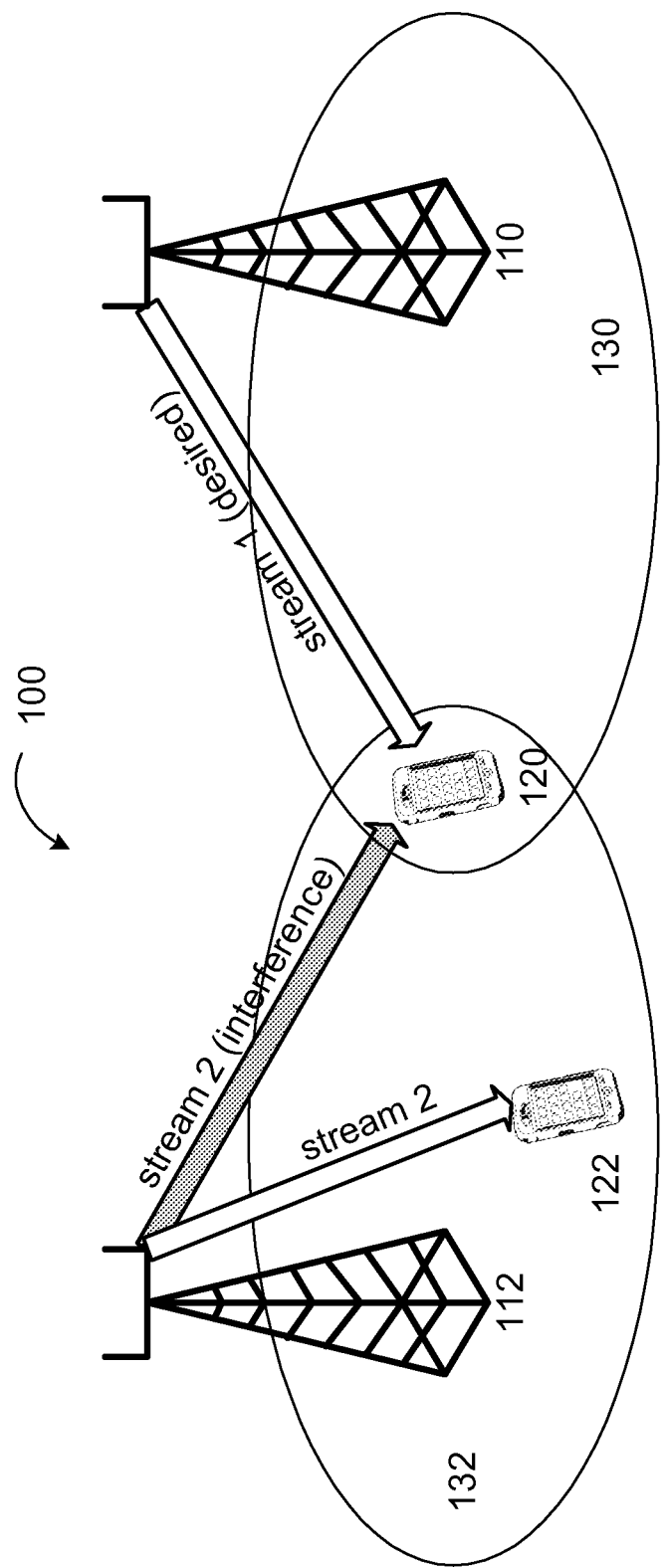
Figure 1D:
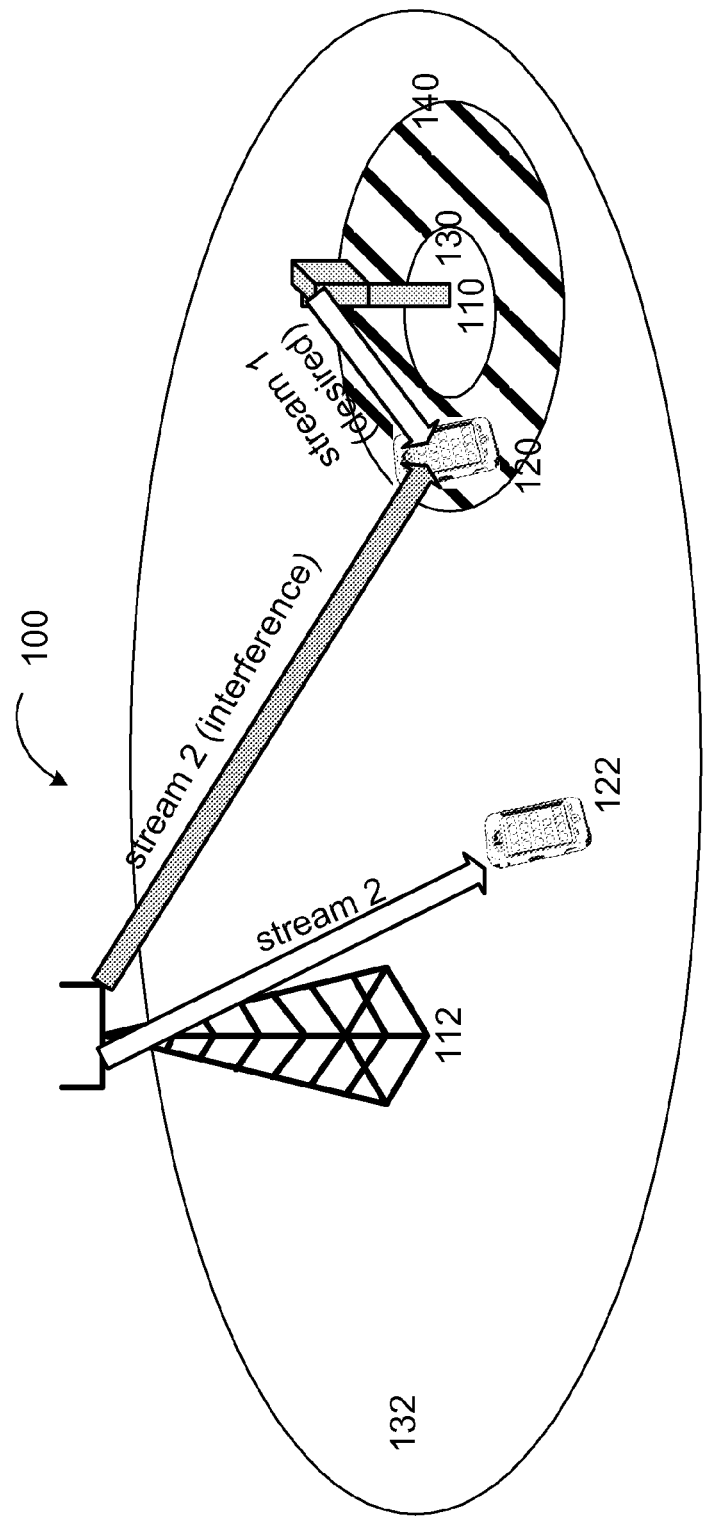

As indicated above, in multi-user MIMO (MU-MIMO) scenarios, as illustrated in FIG. 1B, an interfering data stream is a data stream intended for another UE. Thus, a co-scheduled UE does not have the knowledge of the TF, MCS or UE ID used in the interfering data stream. It is therefore more difficult to cancel the interfering data stream. In LTE, the encoded bits of a physical data channel are scrambled by an identity number associated with the intended UE. Thus, a descrambling step is needed before decoding. It is therefore more difficult to cancel the interfering data stream in the MU-MIMO case.

In this disclosure, "configuration information" generally refers to include parameters that allow a data stream to be decoded. As an illustration, the configuration information can include TF, MCS, UE ID, and radio resource allocation parameters. Other parameters may be included in the configuration information, e.g., UE category, MIMO rank and precoding information, antenna power allocation, HARQ redundancy version, etc. The UE category information may be needed in some cases to translate the transport format indicator to the actual transport block size.

Signaling information to UEs for facilitating interference cancellation in a device-to-device communication scenario has been proposed before. For typical cellular communication scenarios, solutions for facilitating inter-cell interference cancellation at the UE have also been proposed before. For example, a base station can signal its data channel configuration information to the interfered UEs. Such configuration information may be broadcast or power controlled to one or more UEs. However, these approaches can lead to increased radio resource usage, since the power allocation to the control channels carrying such configuration information may need to be increased to be audible in the neighboring cells. Also, they usually cannot be power controlled to their intended target UE.

In another example, a serving eNB can signal to its own scheduled UEs a list of IDs corresponding to the co-channel UEs in neighboring cells. A scheduled UE can then use such a list to attempt to decode the control channels sent in the neighboring cells. The search space of the unknown UE IDs used in neighboring cell's control signals is therefore reduced significantly. Nonetheless, the disadvantages of this solution include higher complexity due to the trial-and-error search process. Furthermore, neighboring cell's control signals may not be audible.

The disclosed subject matter addresses some or all of the issues described above with respect to the conventional solutions. In one or more non-limiting aspects, the base stations do not transmit their data channel configuration. Instead, a mobile terminal's own serving base station acquires such information via one or more inter base station (inter-BS) links, possibly via RNC in the case of HSPA. An example is a link for the X2 interface. The serving base station then can use its own radio resources to deliver such information to the mobile terminal.

Preferably, the inter-BS links utilize communication resources different from the radio resources used between the base stations and mobile terminals in the network. For example, inter-BS links may be implemented via wired or fiber optic lines connecting the base stations and/or RNCs with each other. Another inter-BS links implementation may be through a network of microwave communication stations. By utilizing radio resources other than the radio resources used between base stations and the mobile terminals for the inter-BS links, interference caused by the base stations transmitting their data channel configuration can be significantly reduced or even eliminated altogether.

When delivering the configuration information, the serving base station may target specific mobile terminal(s). Further, the power level for sending such information may be determined based on the channel condition of the targeted beneficiary mobile terminal(s). In an aspect, the information about interfering signal(s) may be delivered using inband signaling for each scheduled mobile terminal. Alternatively, the information about the interfering signal(s) may be delivered to the group of scheduled target mobile terminals.

In short, a serving base station can signal the configuration information about one or more interfering data streams transmitted from neighboring base stations to its own target mobile terminal(s). A separate communication link—the inter-BS link—can be used to pass the configuration information between the base stations.

Figure 2A:
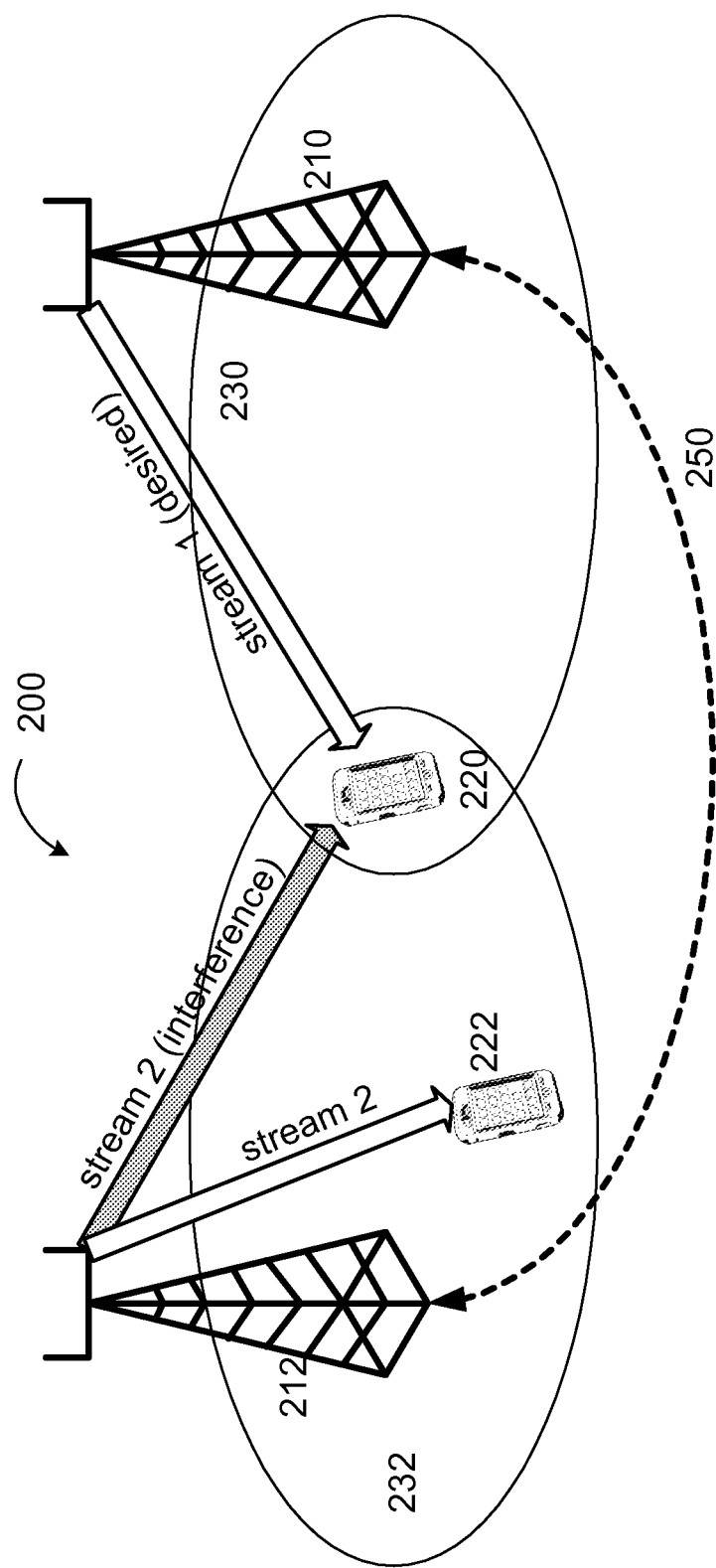
FIGS. 2A, 2B illustrate example scenarios in which one or more aspects of the disclosed subject matter may be utilized to reduce interferences MIMO stream transmissions.
Figure 2B:
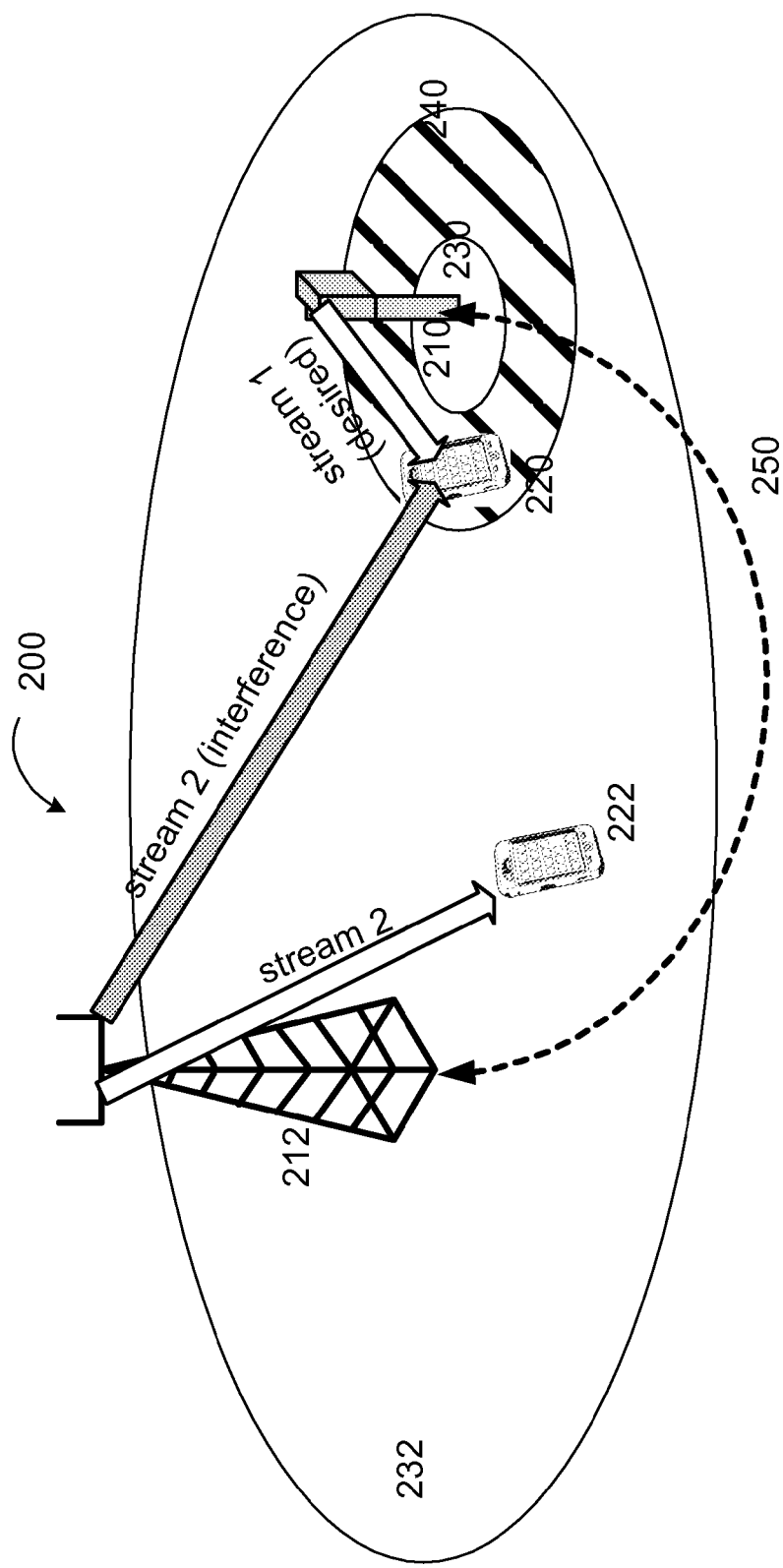

This is illustrated in FIGS. 2A and 2B. Both figures show an example wireless network 200 that includes a serving base station 210 covering a service area (or a cell) 230, and includes a base station 212 that neighbors the serving base station 210. The neighboring base station 212 correspondingly covers a service area 232. The serving and neighboring base stations 210, 212 can communicate with each other via an inter-BS link 250. For simplicity, only two base stations and two mobile terminals are shown. However, this should not be taken to be limiting. The concepts discussed can be expanded and applied to networks with many base stations and many mobile terminals.

In these figures, data streams 1 and 2 are respectively transmitted from the serving and neighboring base stations 210, 212 and respectively intended for the target and the other mobile terminals 220, 222. From the perspective of the mobile terminal 220, the data stream 1 is desired and the data stream 2 is an interfering stream. In FIG. 2A, the mobile terminal 220 can experience significant interferences due to being located close to an edge of the cell 230. In FIG. 2B, the mobile terminal 220 can experience due to being located within the range-expansion zone.

Note that the neighboring base station 212 may cover a neighboring sector and thus may be located at the same site as the serving base station 210 which would signal such configuration information. If the neighboring base station 212 is not collocated, such inter-BS link 250 may be implemented using any proprietary solution or a standard-compliant solution.

After acquiring the configuration information about the interfering data stream(s), the serving base station 210 can deliver interference information to the target mobile terminal 220 through multiple approaches. The interference information in this context includes the configuration information related to one or more interfering data stream(s).

In a first approach, the serving base station 210 can use one or more radio resources exclusively allocated to the target mobile terminal 210 for the specific purpose of delivering the interference information. In a second approach, one or more radio resources that are allocated to co-scheduled mobile terminals 220, 222 can be used specifically to deliver the interference information. In a third approach, the interference information may be packaged and delivered along with scheduled data over exclusively allocated radio resources. But regardless of the approach taken, measures can be taken to enhance the likelihood of the interference information being delivered.

Figure 3:
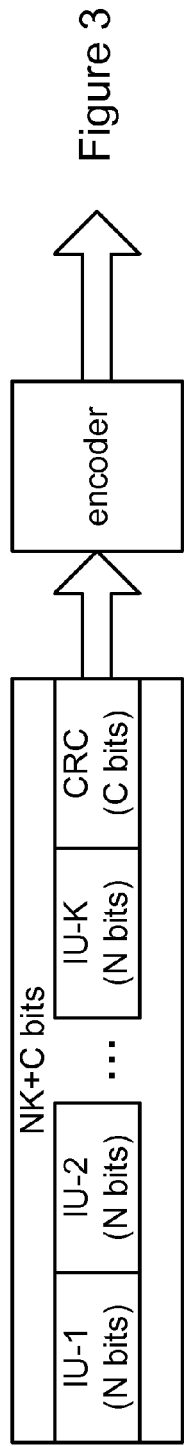
FIGS. 3, 4, 5 illustrate example coding schemes that can be utilized to send configuration information from a serving base station to a target mobile terminal to enable effective interference cancellation.
Figure 4:
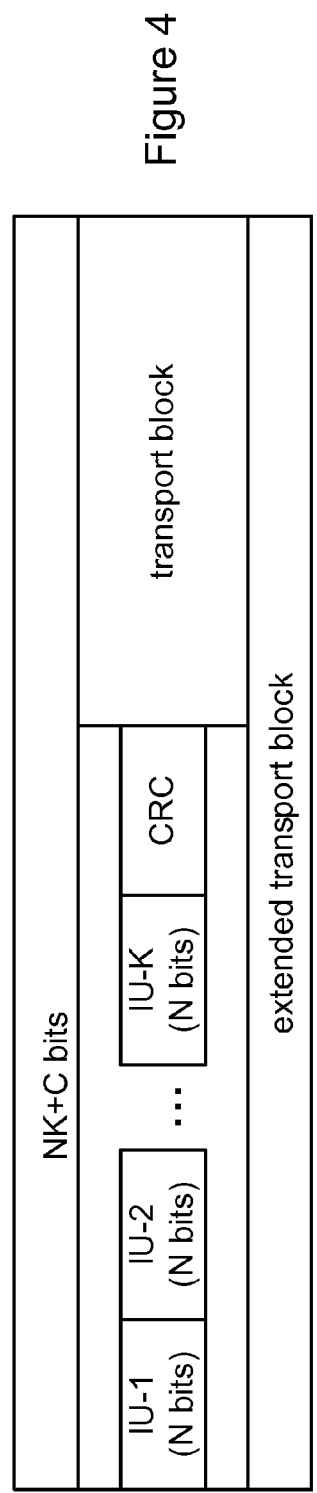
Figure 5:
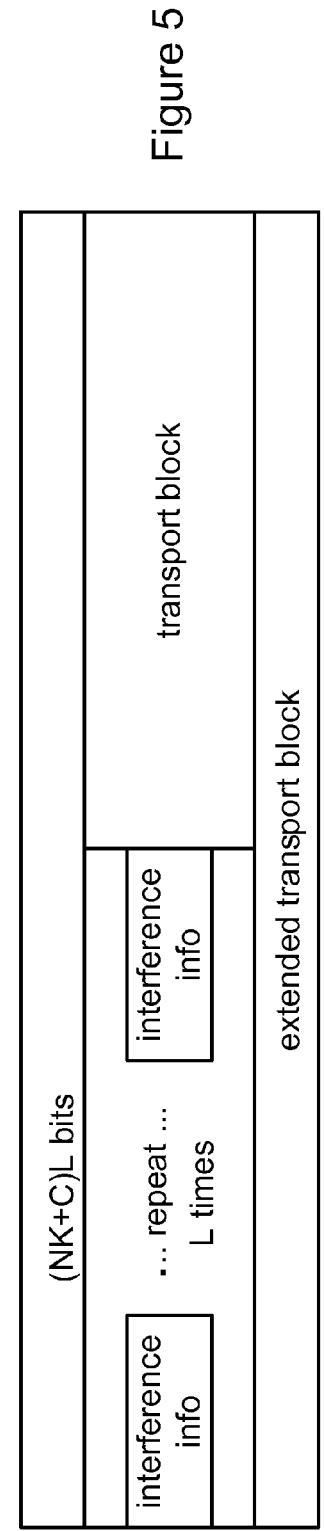

Depending on the approach, the serving base station 210 can code or otherwise format the interference information for delivery to the target mobile terminal 220. FIGS. 3, 4, 5 illustrate example coding schemes that may be applied. The different coding schemes will be described in detail further below. The mentioned approaches and coding schemes should not be taken to be limiting, and the discussed concepts can be expanded cover more approaches.

Note that the serving base station 210 may decide to provide the interference information only under certain circumstances. For example, the serving base station 210 may decide to provide the interference information only when the target mobile terminal 220 is capable of interference cancellation (IC) and when the target mobile terminal 220 is subject to a high level of interference. The serving base station 210 may infer the level of interference being subjected to the target mobile terminal 220 through the terminal's CPICH measurement report.

Figure 6:
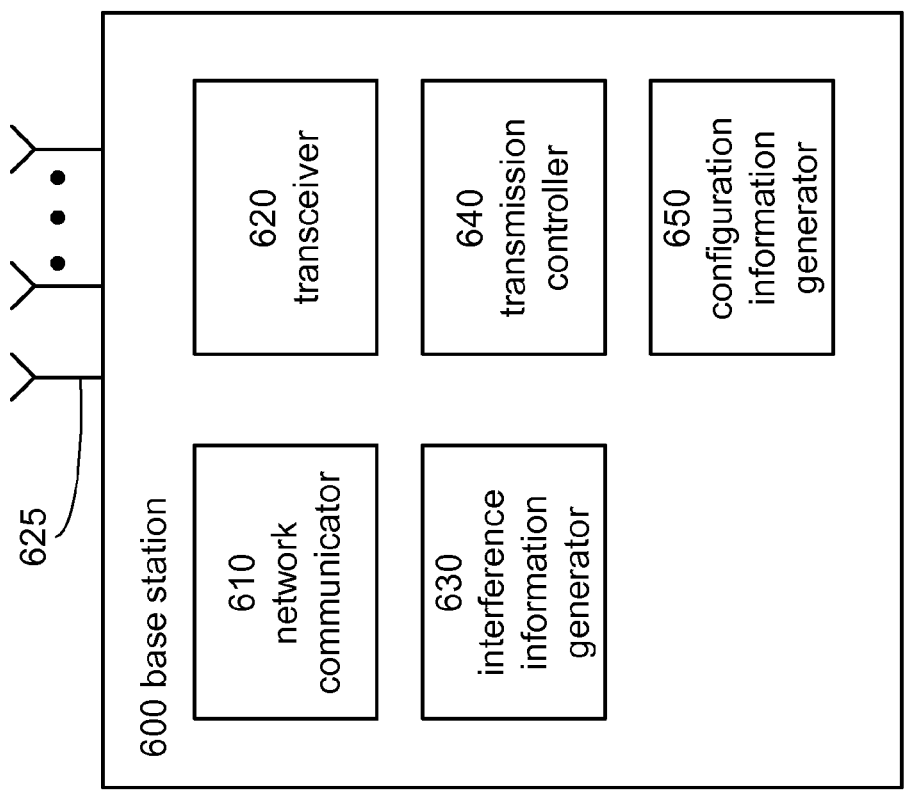

FIG. 6 illustrates an example configuration of a base station 600 structured to function as a serving base station 210. That is, the base station 600 may be structured to provide communication services to a target mobile terminal 220. The base station 600 can also function as a neighboring base station 212. That is, the base station 600 may be structured to provide configuration information related to scheduled data to another base station 210.

The base station 600 may comprise a network communicator 610, a transceiver 620, an interference information generator 630, a transmission controller 640, and a configuration information generator 650. The network communicator 610 may be structured to communicate with one or more neighboring base stations 212 over one or more inter-BS links 250. The transceiver 620 may be structured to wirelessly communicate via one or more antennas 625 with one or more mobile terminals 220, 222. The interference information generator 630 may be structured to form interference information for the target mobile terminal 220. The transmission controller 640 may be structured to control transmissions of the interference information and scheduled data. The configuration information generator 650 may be structured to generate configuration information related to the scheduled data. Functions performed by these devices will be described later in conjunction with FIG. 8.

FIG. 6 provides a logical view of the base station 600 and the devices included therein. It is not strictly necessary that each device be implemented as physically separate modules or circuits. Some or all devices may be combined in one physical module. Also, one or more devices may be implemented in multiple physical modules.

Figure 7:
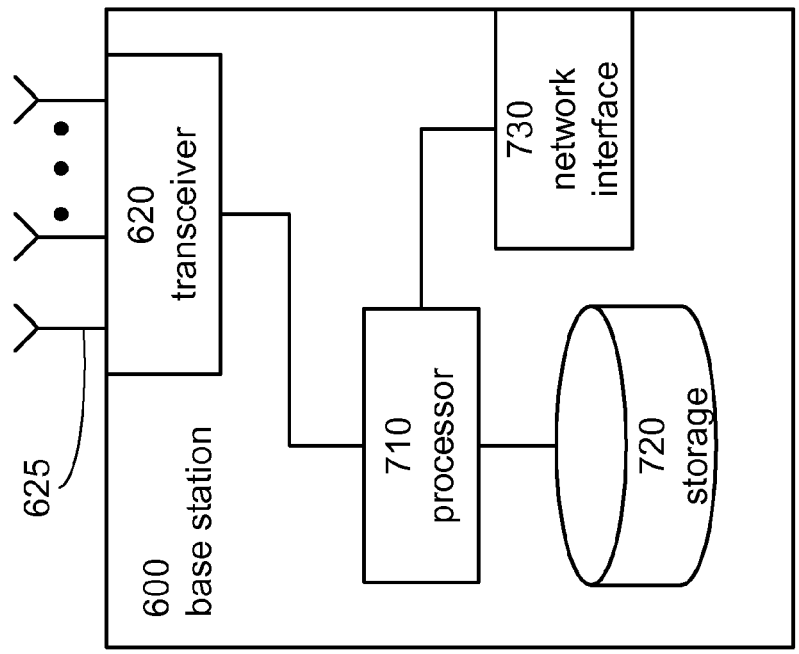
FIGS. 6, 7 illustrate example configurations of a base station.

The devices of the base station 600 need not be implemented strictly in hardware. Any of the devices can be implemented through a combination of hardware and software. For example, as illustrated in FIG. 7, the base station 600 may include one or more processors 710 executing program instructions stored in a non-transitory storage medium or in firmware (e.g., ROM, RAM, Flash) (denoted as storage 720) to perform the functions of the serving base station devices. The transceiver 620 may be structured to receive signals from and send signals to one or more mobile terminals 220, 222 via one or more antennas 625. The transmitter and the receiver may be implemented as physically separate devices. The base station 600 may also include a network interface 730 to communicate with other network nodes including other base stations 210, RNC, and core network nodes.

Figure 8:
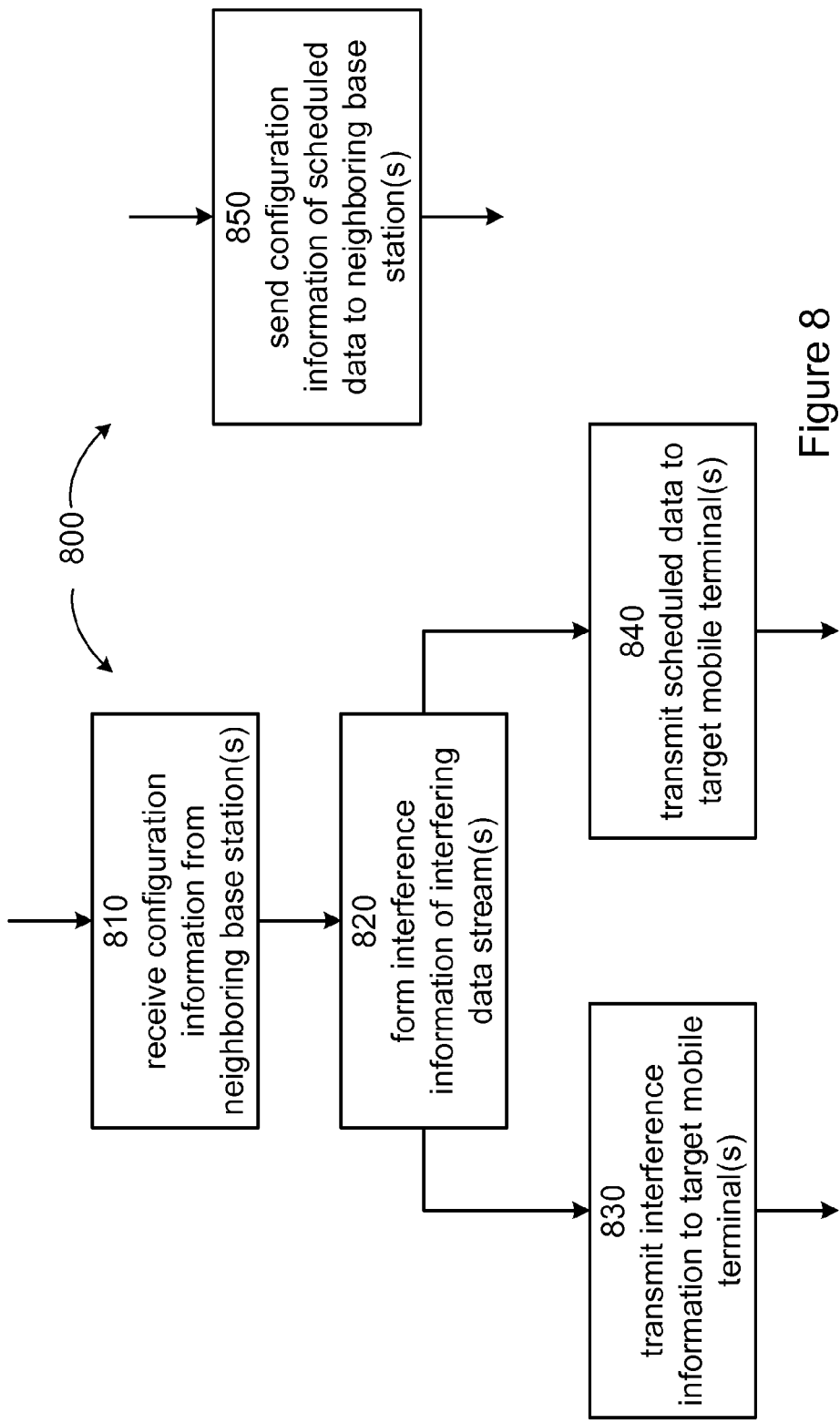
FIG. 8 illustrates a flow chart of an example method performed in a base station.

FIG. 8 illustrates a flow chart of an example method 800 performed by the base station 600 to provide communication services to the target mobile terminal 220. In the method, steps 810-840 correspond to the base station 600 functioning as a serving base station 210 to a target mobile terminal 220 and step 850 corresponds to the base station 600 functioning as a neighboring base station 212. Step 850 is separated from steps 810-840 to indicate that the base station 600 can function as the serving or the neighboring base station asynchronously. In the description of the method, the base station 600 may be referred to as the serving base station 210 or the neighboring base station 212 depending on the context.

As illustrated in FIG. 8, the base station 600, more specifically the network communicator 610, receives configuration information related to one or more interfering data streams from one or more neighboring base stations 212 in step 810. Each interfering data stream is a data stream transmitted by a neighboring base station 212 and intended for a mobile terminal 222 other than the target mobile terminal 220. The data stream 2 in FIGS. 2A and 2B is an interfering data stream to the target mobile terminal 220.

The configuration information are received over one or more inter-BS links 250, which are links for communication among the base stations 600. Preferably, each inter-BS-link 250 utilizes communication resources different from radio resources used between the base stations 210, 212 and mobile terminals 220, 222.

Each configuration information characterizes the related interfering data stream. As an example, configuration information can include information on one or more parameters necessary to decode the related interfering stream. Examples include a transport format, a modulation and coding scheme (MCS), a coding rate, an identification of other terminal 222 (e.g., UE ID) to which that interfering data stream is intended, a scrambling code, a channelization code, downlink resource elements scheduled for the other terminal 222, a category of the other terminal 222, a MIMO rank, precoding information, antenna power allocation, and HARQ redundancy version, among others. This is not necessarily an exhaustive list. Also, any combination of the parameters may be included in the configuration information.

In step 820, interference information generator 630 generates or otherwise forms the interference information for the target mobile terminal 220 based on the configuration information received from the neighboring base station(s) 212. Preferably, when provided to the target mobile terminal 220, the interference information includes the configuration information related to at least one interfering data stream. Furthermore, when provided to the target mobile terminal 220, the interference information enables or aids the target mobile terminal 220 to decode at least one interfering data stream.

In step 830, the transmission controller 640 transmits, via the transceiver 620, the interference information to the target mobile terminal 220 over a radio resource set, which comprises one or more radio resources used to carry data from the serving base station 210 to the target mobile terminal 220. The radio resources can correspond to one or more channelization codes, one or more subcarriers, one or more OFDM symbols, and so on.

The radio resource(s) used to transmit the interference information in step 830 set can be exclusively allocated to the target mobile terminal 220 or can be allocated for common listening. As the name implies, when a radio resource is allocated for common listening, the radio resource can be listened by multiple terminals 220, 222. In the context of this disclosure, a radio resource allocated for common listening can be listened to by the target mobile terminal 220 and one or more mobile terminals 222 that are co-scheduled with the target mobile terminal 220.

There are several ways that a radio resource can be allocated for common listening. In one way, a radio resource (e.g., identified through a channelization code) can be commonly allocated. In another way, a radio resource can be originally allocated to the target mobile terminal 222, but is later taken or otherwise designated by the serving base station 210 as carrying data that should be listened to by the target mobile terminal 220 and the co-scheduled mobile terminals 222. Of course, the situation can be reversed. That is, the radio resource can be originally allocated to a co-scheduled mobile terminal 222 and taken for common listening.

In step 840, the transmission controller 640 also transmits scheduled data to the target mobile terminal 220 over the radio resource set via the transceiver 620. Preferably, the radio resources used in this step are all exclusively allocated to the target mobile terminal 220. The scheduled data comprises one or more data streams intended for transmission from the serving base station 220 to the target mobile terminal 210. Note that steps 830 and 840 may take place at the same time.

In one aspect, the radio resources are divided into at least first and second radio resource sets such that each set comprises one or more radio resources of the radio resource set. When the first and second sets are different, i.e., they do not have any radio resources in common, the two sets can be used for different purposes. For example, the first radio resource set can be used to transmit the interference information in step 830, and the second radio resource set can be used to transmit the scheduled data in step 840. It can be said that the first and second radio resource sets correspond to different channelization codes, subcarriers, or OFDM symbols from each other.

The transmission controller 640 can transmit downlink data for the target mobile terminal 220, which includes the interference information and the scheduled data, on a downlink shared channel. In one embodiment, the radio resources of the first radio resource set can be identifiable through corresponding one or more channelization codes (e.g., in HSPA), which should be different from the channelization codes of the second radio resource set. In another embodiment, the resources can be identifiable through corresponding one or more subcarriers and one or more OFDM symbols (e.g., in LTE), which should be different from the subcarriers and/or the OFDM symbols of the second radio resource set.

Recall that the radio resources used in step 840 to carry the scheduled data are preferably all exclusively allocated to the target mobile terminal 220. This means that the radio resources of the second radio resource set are all exclusively allocated.

However, the radio resources of the first radio resource set used to carry the interference information in step 830 can be exclusively allocated or allocated for common listening. When all radio resources of the first radio resource set are exclusively allocated to the target mobile terminal 220, the interference information generator 630 can form the interference information specifically for the target mobile terminal 220 in step 820.

FIG. 9 illustrates a flow chart of an example process performed by the serving base station 210 to implement the step 820 when the first radio resource set is exclusively allocated. For each interfering data stream, the interference information generator 630 in step 910 determines, based on the related configuration information, whether a level of interference to the target mobile terminal 220 contributed by that interfering data stream will exceed a predetermined threshold interference level. If so, the interference information generator 630 includes the related configuration information in the interference information in step 920. This process is repeated (step 930) until all interfering data streams are analyzed.

FIG. 3 illustrates an example of a form of the interference information that may be used in HSPA to inform the target mobile terminal 220 about assignment of interference configuration signaling codes (ICSC) via higher layers. All the legacy terminals will still receive regular HS-DSCH data from the HS-PDSCH indicated as ICSC codes. However, a new class of IC capable mobile terminals such as the target mobile terminal 220 can use these codes to receive either the regular HS-DSCH data or interference configuration signaling.

One HS-PDSCH code carries 480 symbols per 2 ms TTI, and, with QPSK modulation, there are 960 bits per code per TTI. An ICSC may carry the configuration information of up to K interferers. In the exemplary encoding scheme illustrated in FIG. 3, after concatenating K configuration information sets, a number of CRC bits are generated and added. The CRC added data is encoded to 960 bits.

Since the interference information is formed specifically for the target mobile terminal 220, the transmission of the interference information itself can also be tailored as well. FIG. 10 illustrates a flow chart of an example process performed by the serving base station 210 to implement step 830 when the first radio resource set is exclusively allocated. In step 1010, the transmission controller 640 receives a feedback from the target mobile terminal 220 via the transceiver 620 regarding a quality of a signal transmission from the serving base station 210 as measured by the target mobile terminal 220. In step 1020, the transmission controller 630 controls a transmit power of the interference information applied by the transceiver 620 based on the feedback.

On the other hand, when the radio resources of the first radio resource set are allocated for common listening, the interference information can be listened to by all of the co-scheduled mobile terminals 220, 222. In this instance, the interference information should include configuration information relevant to any of the co-scheduled mobile terminals 220, 222.

FIG. 11 illustrates a flow chart of an example process performed by the serving base station 210 to implement the step 820 when the first radio resource set is allocated for common listening. For each interfering data stream, the interference information generator 630 in step 1110 determines, based on the related configuration information, whether a level of interference to any of the co-scheduled mobile terminals 220, 222 contributed by that interfering data stream will exceed a predetermined threshold interference level. If so, the interference information generator 630 includes the related configuration information in the interference information in step 1120. This process is repeated (step 1130) until all interfering data streams are analyzed.

When the interference information is formed for the co-scheduled mobile terminals 220, 222, the transmission of the interference information can still be tailored, but to a lesser degree. FIG. 12 illustrates a flow chart of an example process performed by the serving base station 210 to implement step 830 when the first radio resource set is commonly allocated. In step 1210, the transmission controller 640 receives feedbacks from the commonly scheduled mobile terminals 220, 222 regarding qualities of signal transmissions from the serving base station 210 as measured by the commonly scheduled mobile terminals 220, 222. In step 1220, the transmission controller 640 controls a transmit power of the interference information applied by the transceiver 620 based on the feedbacks.

When different radio resource sets are used to transmit the interference information and the scheduled data, the transmission schemes used in performing step 830 and 840 can be independently set. FIGS. 13, 14 illustrate flow charts of example processes performed in the serving base station 210 to implement steps 830, 840 when the first and second radio resource sets are used to respectively transmit the interference information and the scheduled data. To implement the step 830, the transmission controller 640 sets a first modulation and coding scheme (MCS) in step 1310, encodes and modulates the interference information based on the first MCS to generate a first stream of modulation symbols in step 1320, and transmits the first stream via the transceiver 620 over all radio resources of the first radio resource set in step 1330. To implement the step 840, the transmission controller 640 sets a second MCS in step 1410, encodes and modulates the scheduled data based on the second MCS to generate a second stream of modulation symbols in step 1420, and transmits the second stream via the transceiver 620 over all radio resources of the second radio resource set in step 1430. Preferably, the first and second MCSs are independently set in steps 1310 and 1410.

In step 1310, the transmission controller 640 sets the first MCS so as to meet or exceed first threshold decode reliability level. The decode reliability levels can be expressed in any parameters that indicates a quality of service such as CQI, BER, FER, throughput, and so on. In step 1410, the transmission controller 640 sets the second MCS so as to meet or exceed second threshold decode reliability level.

Preferably, reliability may be emphasized in the interference information transmission and performance may be emphasized in the scheduled data transmission. At the very least, it is preferred that the chances of correctly receiving the interference information should be at least as good as the chances of correctly receiving the scheduled data. This can be accomplished by setting the first threshold decode reliability level to be greater than or equal to the second threshold decode reliability level.

In a different aspect, the radio resources of the radio resource set are not divided. In this aspect, all radio resources are used to carry both the interference information and the scheduled data. That is, the transmission controller 640 can transmit the interference information over all radio resources of the radio resource set in step 830, and can transmit the scheduled data also over the same all radio resources of the radio resource set in step 840. This can be referred to as "inband" signaling. In this aspect, the resources of the communication set are preferably all exclusively allocated to the target mobile terminal 220.

The serving base station 210 may transmit downlink data for the target mobile terminal 220, which includes the interference information and the scheduled data, on a downlink shared channel. The radio resources of the radio resource set can be identifiable through corresponding one or more channelization codes or through corresponding one or more sub-carriers and one or more OFDM symbols.

Figure 15:
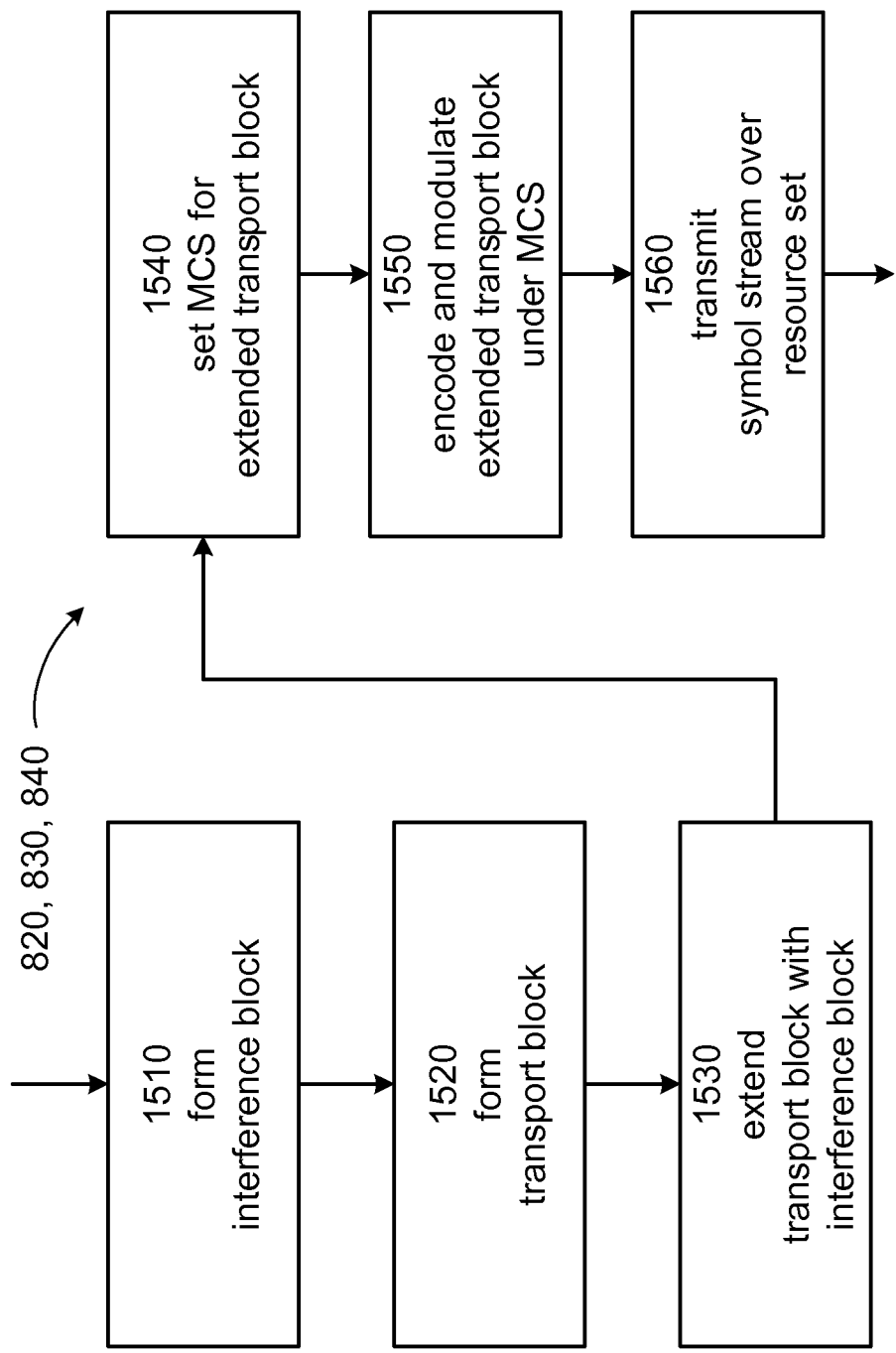
FIG. 15 illustrates a flow chart of an example process performed in a base station to transmit interference information and scheduled data to a target mobile terminal.

FIG. 15 illustrates a flow chart of an example process performed in the serving base station 210 to implement steps 820, 830, 840 when all resources of the radio resource sets are used to transmit both the interference information and the scheduled data. In step 1510, the interference information generator 630 forms an interference block that comprises the configuration information of the interfering data streams. The transmission controller 640 forms a transport block that comprises the scheduled data in step 1520, forms an extended transport block by extending the transport block to include the interference block in step 1530, sets an MCS for the extended transport block in step 1540, and encodes and modulates the extended transport based on the MCS to generate an extended stream of modulation symbols in step 1550. The transceiver 620 transmits the extended stream over all radio resources of the radio resource set under the control of the transmission controller 640 in step 1560.

Figure 16:
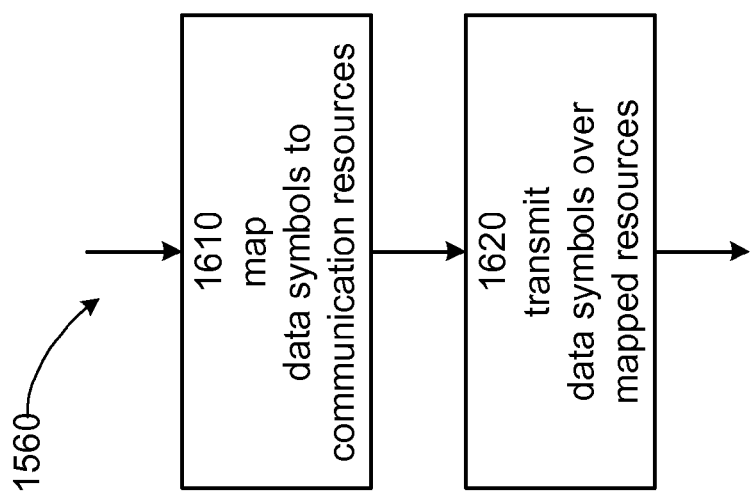

FIG. 16 illustrates a flow chart of an example process performed in the serving base station 210 to implement the steps 1560. In step 1610, the transmission controller 650 maps each modulation symbol of the extended stream to one or more radio resources of the radio resource set. Preferably, each radio resource is mapped to at least one modulation symbol of the extended stream so as to maximize the usage of the radio resources. In step 1620, the transceiver 620 transmits the extended stream in accordance to the mapping.

FIG. 4 illustrates an example of a form of the extended transport block that may be used. In this figure, the interference block and the transport block are transported as a single extended transport block. One MCS is chosen for the extended transport block meaning that the same MCS is applied to the interference information in the interference block and the scheduled data in the transport block.

But as indicated above, it may be preferred that reliability be emphasized more for the interference information relative to the scheduled data. When the same MCS is used to transport both, one way to enhance the reliability is to transmit multiple copies of the same interference information. FIG. 5 illustrates an example of a form of the extended transport block where the interference information is repeated L times. Another way to enhance reliability is to encode the interference information using an error correction code.

Figure 17:
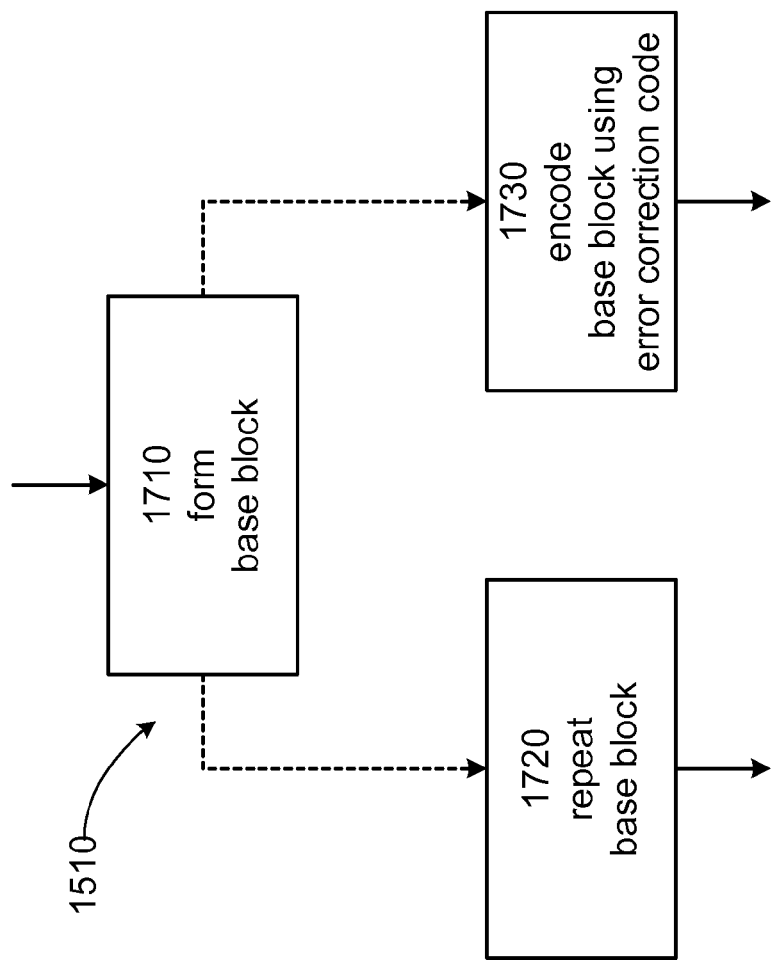
FIGS. 17, 18 illustrate flow charts of example processes performed in a base station to form an interference block.

FIG. 17 illustrates a flow chart of an example process to enhance reliability of the interference information. In step 1710, the interference information generator 630 forms a base block which comprises the configuration information of the interfering data streams. Then in step 1720, interference information generator 630 forms the interference configuration block by repeating the base block a predetermined number of times greater than one. Alternatively in step 1730, interference information generator 630 forms the interference configuration block encoding the base block with a predetermined error correction code. Of course, steps 1720 and 1730 may be combined.

Figure 18:
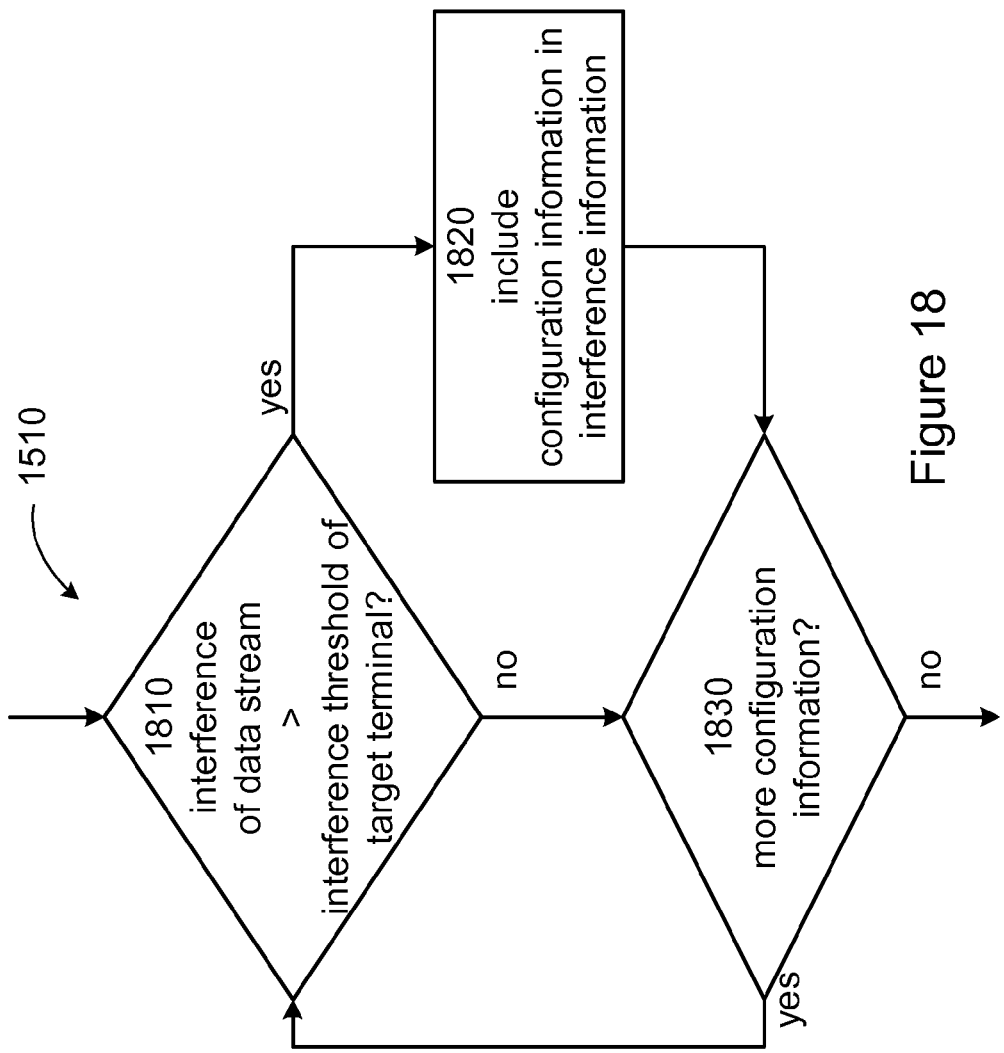

Since all radio resources are exclusively allocated to the target mobile terminal 220, the interference information can be tailored to the target mobile terminal 220. FIG. 18 illustrates a flow chart of an example process performed by the serving base station 210 to implement the step 1510. For each interfering data stream, the interference information generator 630 in step 1810 determines, based on the related configuration information, whether a level of interference to the target mobile terminal 220 contributed by that interfering data stream will exceed a predetermined threshold interference level. If so, the interference information generator 630 includes the related configuration information in the interference information in step 1820. This process is repeated (step 1830) until all interfering data streams are analyzed.

The transmission of the extended transport block can be tailored as well. FIG. 19 illustrates a flow chart of an example process performed by the serving base station 210 to implement steps 1540 and 1560. In step 1910, the transmission controller 640 receives a feedback from the target mobile terminal 220 via the transceiver 620 regarding a quality of a signal transmission from the serving base station 210 as measured by the target mobile terminal 220. In step 1920, the feedback from the target mobile terminal 220 regarding the quality of a signal transmission from the serving base station 210 can be used by the transmission controller 640 to determine the MCS for encoding and modulating the extended transport block. In step 1930, the transmission controller 630 controls a transmit power of the extended transport block applied by the transceiver 620 based on the feedback. Note that the step 1930 of controlling of the transmit power is optional.

Referring back to FIG. 8, the base station 600 can also provide configuration information to its neighbors in step 850 so that interferences due to the scheduled data to the mobile terminals 222 that they serve can be mitigated. FIG. 20 illustrates an example process performed by the base station 600 to implement the step 850. In step 2010, the configuration information generator 650 forms the configuration information related to the data streams of the scheduled data. In step 2020, the network communicator 610 sends the configuration information to other base stations 210 over the inter-BS links 250. Note that the inter-BS links can also connect to RNCs in case of HSPA.

The method 800 can be implemented through programming instructions that when a computer or a processor of a base station 600 executes the programming instructions, the computer/processor executes the method 800 as described. The programming instructions may be stored in a non-transitory computing medium (e.g., DVD, CD, RAM, ROM, etc.) or may be provided as signals to the base station 600.

Figure 21:
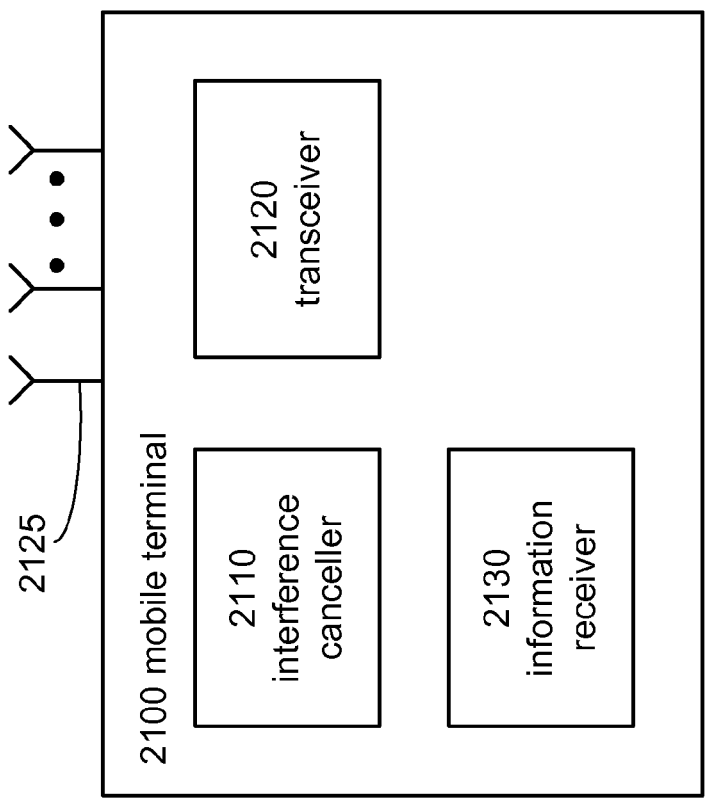

FIG. 21 illustrates an example configuration of a mobile terminal 2100 capable of performing interference cancellation. The mobile terminal 2100 may comprise an interference canceller 2110, a transceiver 2120, and an information receiver 2130. The transceiver 2120 may be structured to wirelessly communicate via one or more antennas 2125 with a serving base station 210. The information receiver 2030 may be structured to receive the interference information and scheduled data from the serving base station 210. The interference canceller 2010 may be structured to cancel interferences based on the received interference information. Functions performed by the mobile terminal 2100 will be described later in conjunction with FIG. 23.

Figure 22:
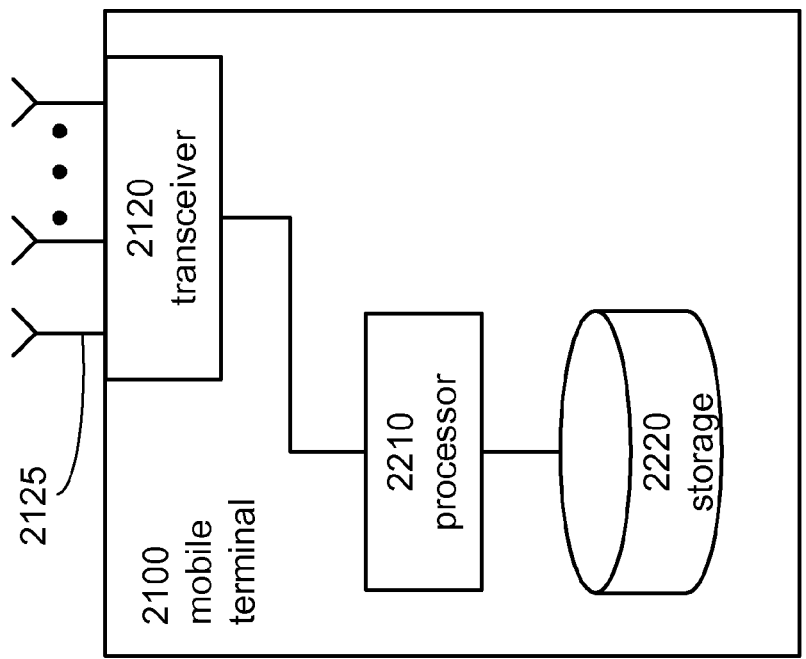
FIGS. 21, 22 illustrate example configurations of a mobile terminal.

FIG. 21 provides a logical view of the mobile terminal 2100 and the devices included therein. It is not strictly necessary that each device be implemented as physically separate modules or circuits. Some or all devices may be combined in one physical module. Also, one or more devices may be implemented in multiple physical modules. The devices need not be implemented strictly in hardware. Any of the devices can be implemented through a combination of hardware and software. For example, as illustrated in FIG. 22, the mobile terminal 2100 may include one or more processors 2210 executing program instructions stored in a non-transitory storage medium or in firmware (e.g., ROM, RAM, Flash) (denoted as storage 2220) to perform the functions of the serving base station devices. The transceiver 2120 may be structured to receive signals from and send signals to one or more base stations 210, 212. The transmitter and the receiver may be implemented as physically separate devices.

FIG. 23 illustrates a flow chart of an example method 2300 performed by the mobile terminal 2100 to perform interference cancellation. Before proceeding, concepts such as interference information, configuration information, scheduled data, interfering data stream, exclusive allocation, allocation for common listening, and so on have been described above. Thus, the detail descriptions thereof will not be repeated.

In FIG. 23, the information receiver 2030 receives the interference information in step 2310 and receives the scheduled data in step 2320, both of which are transmitted from the serving base station 210 over the radio resource set. In step 2330, the interference canceller 2110 cancels the interference based on the interference information.

Recall that in one aspect, the different radio resource sets such as first and second radio resource sets can be used to carry the interference information and the scheduled data. The first radio resource set can be exclusively allocated to the mobile terminal 2100 or allocated for common listening. The second radio resource set is preferably exclusively allocated.

Also recall that the MCSs used can be independently set. FIGS. 24A and 24B illustrate flow charts of example processes performed in the mobile terminal 2100 to implement steps 2310, 2320 when the first and second radio resource sets are used to respectively receive the interference information and the scheduled data. To implement the step 2310, the information receiver 2030 determines the first MCS used to modulate and code the interference information in step 2410, and demodulates and decodes the interference information based on the MCS in step 2420. To implement the step 2320, the information receiver 2030 determines the second MCS used to modulate and code the scheduled data in step 2415, and demodulates and decodes the scheduled data based on the second MCS in step 2425.

Recall that in another aspect, all radio resources are used to carry both the interference information and the scheduled data. FIG. 25 illustrates a flow chart of an example process performed in the mobile terminal 2100 to implement steps 2310, 2320 when all resources of the radio resource sets are used to receive both the interference information and the scheduled data. The information receiver 2130 receives an extended stream transmitted from the serving base station 210 over the radio resource set in step 2510, determines a MCS used to form the modulation symbols of the extended stream in step 2520, demodulates and decodes the extended stream based on the MCS to recover an extended transport block in step 2530, processes the interference block to obtain the interference information in step 2540, and processes the transport block to obtain the scheduled data in step 2550.

FIG. 26 illustrates a flow chart of an example process performed in the mobile terminal 2100 to implement the steps 2510. In step 2610, the information receiver 2130 determines a mapping between the modulation symbols of the extended stream and the radio resources of the radio resource set in step 2610, and demaps the extended stream based on the mapping in step 2620.

Further recall that all radio resources are used to carry the interference information and the scheduled data, then the reliability of interference information can be enhanced by repeating or by error correction coding. When the interference block comprises a base block repeated a predetermined number of times greater than one, the information receiver 2130 can process at least one of the base blocks in step 2540. When the interference block comprises a base block that has been encoded with a predetermined error correction code, the information receiver 2130 can decode the encoded base block based on the predetermined error correction code to obtain the interference information.

When the extended stream has been mapped to multiple radio resources, then as illustrated in FIG. 26, the information receiver 2130 can determine the mapping between the modulation symbols of the extended stream and the radio resources of the radio resource set in step 2610, and demap the extended stream based on the mapping in step 2620.

The method 2300 can be implemented through programming instructions that when a computer or a processor of a mobile terminal 62100 executes the programming instructions, the computer/processor executes the method 2300 as described. The programming instructions may be stored in a non-transitory computing medium or may be provided as signals to the mobile terminal 2100.

One advantage the disclosed subject matter is that interference cancellation of MU-MIMO and other-cell interference are made easier, and in some cases, feasible in the first place, without the mobile terminal blindly detecting the UE ID(s) or the configuration information of interfering data streams, which can come from the serving base station or other base stations. Regardless, interference cancellation improves both user data rate and system throughput. Another advantage is that helpful configuration information are delivered efficiently in terms of both radio resource consumption and mobile terminal battery consumption.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed in a serving base station of a wireless network providing communication services to a target mobile terminal, the method comprising:
receiving from one or more neighboring base stations over one or more inter-BS links one or more configuration information related to one or more interfering data streams, each interfering data stream being a data stream transmitted by a neighboring base station and intended for a mobile terminal other than the target mobile terminal, and each configuration information characterizing a related interfering data stream;
forming an interference information for the target mobile terminal based on the one or more configuration information received from the one or more neighboring base stations, the interference information comprising the configuration information related to at least one interfering data stream;
transmitting the interference information to the target mobile terminal over a radio resource set, the radio resource set comprising one or more radio resources used to carry data from the serving base station to the target mobile terminal; and
transmitting scheduled data to the target mobile terminal over the radio resource set, the scheduled data comprising one or more data streams intended for transmission from the serving base station to the target mobile terminal,
wherein the inter-BS links are communication links for communication among base stations, each inter-BS-link utilizing communication resources different from the radio resource(s) used between the base stations and mobile terminals in the network,
wherein all radio resources of the radio resource set are exclusively allocated to the target mobile terminal, and
wherein the steps of forming the interference information, the step of transmitting the interference information and the step of transmitting the scheduled data to the target mobile terminal comprise:
forming an interference block comprising the configuration information of the interfering data streams;
forming a transport block comprising the scheduled data;
extending the transport block to include the interference block to form an extended transport block;
setting a modulation and coding scheme for the extended transport block;
encoding and modulating the extended transport block based on the modulation and coding scheme to generate an extended stream of modulation symbols; and
transmitting the extended stream over all radio resources of the radio resource set.

2. The method of claim 1, wherein the interference information enables the target mobile terminal to decode at least one interfering data stream.

3. The method of claim 1, wherein the configuration information for each interfering data stream comprises any one or more of a transport format, a modulation and coding scheme, a coding rate, an identification of other terminal to which that interfering data stream is intended, a scrambling code, a channelization code, downlink resource elements scheduled for the other terminal, a category of the other terminal, a MIMO rank, preceding information, antenna power allocation, and HARQ redundancy version.

4. The method of claim 1,
wherein the step of forming the interference information for the target mobile terminal comprises:
determining, for each interfering data stream, whether a level of an interference to the target mobile terminal contributed by that interfering data stream will exceed a predetermined threshold interference level; and
including in the interference information the configuration information of those interfering data streams whose interference contribution level exceeds the predetermined threshold interference level.

5. The method of claim 1,
wherein the radio resource set comprises a plurality of radio resources, and
wherein the step of transmitting the extended stream comprises:
mapping each modulation symbol of the extended stream to one or more radio resources of the radio resource set such that each radio resource is mapped to at least one modulation symbol of the extended stream; and
transmitting the extended stream in accordance to the mapping.

6. The method of claim 1, wherein the step of forming the interference block comprises:
forming a base block comprising the configuration information of the interfering data streams; and
forming the interference configuration block by one or both of:
repeating the base block a predetermined number of times greater than one, and
encoding the base block with a predetermined error correction code.

7. The method of claim 1, further comprising sending configuration information related to the scheduled data from the base station to the one or more neighboring base stations over the one or more inter-BS links.

8. A method performed in a target mobile terminal capable of performing interference cancellation, the method comprising:
receiving interference information transmitted from a serving base station over a radio resource set, the interference information comprising one or more configuration information related to one or more interfering data streams, each interfering data stream being a data stream transmitted by a neighboring base station and intended for a mobile terminal other than the target mobile terminal, and each configuration information characterizing a related interfering data stream;

receiving scheduled data transmitted from the serving base station over the radio resource set, the scheduled data comprising one or more data streams intended for transmission from the serving base station to the target mobile terminal; and canceling interferences from the scheduled data based on the interference information, wherein the radio resource set comprises one or more radio resources used to carry data from the serving base station to the target mobile terminal, wherein all radio resources of the radio resource set are exclusively allocated to the target mobile terminal, and wherein the step of receiving the interference information and the step of receiving the scheduled data from the serving base station comprise:

receiving an extended stream transmitted from the serving base station over the radio resource set, the extended stream comprising one or more modulation symbols;

determining a modulation and coding scheme used to form the modulation symbols of the extended stream;

demodulating and decoding the extended stream based on the modulation and coding scheme to recover an extended transport block;

obtaining the interference information by processing an interference block of the extended transport block; and obtaining the scheduled data by processing a transport block of the extended transport block.

9. The method of claim 8, wherein the interference information enables the target mobile terminal to decode at least one interfering data stream.

10. The method of claim 8, wherein the configuration information for each interfering data stream comprises any one or more of a transport format, a modulation and coding scheme, a coding rate, an identification of other terminal to which that interfering data stream is intended, a scrambling code, a channelization code, downlink resource elements scheduled for the other terminal, a category of the other terminal, a MIMO rank, preceding information, antenna power allocation, and HARQ redundancy version.

11. The method of claim 8, wherein when the interference block comprises a base block repeated a predetermined number of times greater than one, each base block comprising the configuration information of the interfering data streams, the step of obtaining the interference information comprises processing at least one of the base blocks, and wherein when the interference block comprises the base block encoded with a predetermined error correction code, the step of obtaining the interference information comprises decoding the encoded base block based on the predetei mined error correction code.

12. A base station of a wireless network structured to provide communication services to a target mobile terminal, the base station comprising:

a network communicator, an interference information generator, and a transmission controller, wherein the network communicator is structured to receive from one or more neighboring base stations over one or more inter-BS links one or more configuration information related to one or more interfering data streams, each interfering data stream being a data stream transmitted by a neighboring base station and intended for a mobile terminal other than the target mobile terminal, and each configuration information characterizing a related interfering data stream, wherein the interference information generator is structured to form an interference information for the target mobile terminal based on the one or more configuration information received from the one or more neighboring base stations, the interference information comprising the configuration information related to at least one interfering data stream, wherein the transmission controller is structured to transmit the interference information and scheduled data, via a transceiver, to the target mobile terminal over a radio resource set, the scheduled data comprising one or more data streams intended for transmission from the serving base station to the target mobile terminal, and wherein the inter-BS links are communication links for communication among base stations, each inter-BS-link utilizing communication resources different from the radio resources used between the base stations and mobile terminals in the network, wherein the radio resource set comprises one or more radio resources used to carry data from the serving base station to the target mobile terminal, wherein all radio resources of the radio resource set are exclusively allocated to the target mobile terminal, wherein the interference information generator is structured to form an interference block comprising the configuration information of the interfering data streams, wherein the transmission controller is structured to:
  form a transport block comprising the scheduled data,
  extend the transport block to include the interference block to form an extended transport block,
  set a modulation and coding scheme for the extended transport block,
  encode and modulate the extended transport based on the modulation and coding scheme to generate an extended stream of modulation symbols, and
  transmit the extended stream over all radio resources of the radio resource set.

13. The base station of claim 12, wherein the interference information generator is structured to:
  form a base block comprising the configuration information of the interfering data streams, and
  form the interference block by one or both of:
    repeating the base block a predetermined number of times greater than one, and
    encoding the base block with a predetermined error correction code.

14. A target mobile terminal structured to cancel interferences, the target mobile terminal comprising:

an interference canceller and an information receiver, wherein the information receiver is structured to:
  receive interference information, via a transceiver, transmitted from a serving base station over a radio resource set, the interference information comprising one or more configuration information related to one or more interfering data streams, each interfering data stream being a data stream transmitted by a neighboring base station and intended for a mobile terminal other than the target mobile terminal, and each configuration information characterizing a related interfering data stream, and
  receive scheduled data, via the transceiver, transmitted from the serving base station over the radio resource set, the scheduled data comprising one or more data streams intended for transmission from the serving base station to the target mobile terminal, wherein the interference canceller is structured to cancel interferences from the scheduled data based on the interference information, wherein the radio resource set comprises one or more radio resources used to carry data from the serving base station to the target mobile terminal, wherein all radio resources of the radio resource set are exclusively allocated to the target mobile terminal, wherein the information receiver is structured to:

receive an extended stream transmitted from the serving base station over the radio resource set, the extended stream comprising one or more modulation symbols, determine a modulation and coding scheme used to form the modulation symbols of the extended stream, demodulate and decode the extended stream based on the modulation and coding scheme to recover an extended transport block;

process an interference block of the extended transport block to obtain the interference information, and process a transport block of the extended transport block to obtain the scheduled data.

15. The target mobile terminal of claim 14, wherein when the interference block comprises a base block repeated a predetermined number of times greater than one, each base block comprising the configuration information of the interfering data streams, the information receiver is structured to process at least one of the base blocks to obtain the interference information, and wherein when the interference block comprises the base block encoded with a predetermined error correction code, the information receiver is structured to decode the encoded base block based on the predetermined error correction code to obtain the interference information.

* * * * *

UNITED STATES PATENT AND TRADEMARK OFFICE
CERTIFICATE OF CORRECTION

PATENT NO. : 8,958,753 B2
APPLICATION NO. : 13/451076
DATED : February 17, 2015
INVENTOR(S) : Wang et al.

It is certified that error appears in the above-identified patent and that said Letters Patent is hereby corrected as shown below:

In the Specification

In Column 12, Line 24, delete "transmission controller 630" and insert -- transmission controller 640 --, therefor.

In Column 14, Line 3, delete "transmission controller 650" and insert -- transmission controller 640 --, therefor.

In Column 14, Line 66, delete "transmission controller 630" and insert -- transmission controller 640 --, therefor.

In the Claims

In Column 19, Line 56, in Claim 11, delete "predetei mined" and insert -- predetermined --, therefor.

Signed and Sealed this
Twenty-eighth Day of July, 2015

Michelle K. Lee
*Director of the United States Patent and Trademark Office*